US012412992B2

(12) United States Patent
Chowdhury et al.

(10) Patent No.: US 12,412,992 B2
(45) Date of Patent: Sep. 9, 2025

(54) METHOD AND APPARATUS FOR OVER-THE-AIR NEURAL NETWORKS VIA RECONFIGURABLE INTELLIGENT SURFACES

(71) Applicant: Northeastern University, Boston, MA (US)

(72) Inventors: Kaushik Chowdhury, Needham, MA (US); Yousof Naderi, Brookline, MA (US); Ufuk Muncuk, Waltham, MA (US)

(73) Assignee: Northeastern University, Boston, MA (US)

( * ) Notice: Subject to any disclaimer, the term of this patent is extended or adjusted under 35 U.S.C. 154(b) by 644 days.

(21) Appl. No.: 17/721,409

(22) Filed: Apr. 15, 2022

(65) Prior Publication Data

US 2022/0344826 A1    Oct. 27, 2022

Related U.S. Application Data

(60) Provisional application No. 63/175,114, filed on Apr. 15, 2021.

(51) Int. Cl.
*G06N 3/06* (2006.01)
*G06N 3/08* (2023.01)
*H01Q 15/14* (2006.01)
*H01Q 19/18* (2006.01)

(52) U.S. Cl.
CPC .............. *H01Q 15/147* (2013.01); *G06N 3/08* (2013.01); *H01Q 19/18* (2013.01)

(58) Field of Classification Search
CPC ........ H01Q 15/147; H01Q 19/18; G06N 3/08; G06N 3/045; G06N 3/06; G06N 3/084
See application file for complete search history.

(56) References Cited

U.S. PATENT DOCUMENTS

| 11,184,783 B1* | 11/2021 | Melodia | G06N 3/084 |
| 2021/0013619 A1* | 1/2021 | Alkhateeb | H04B 7/04013 |
| 2024/0040560 A1* | 2/2024 | Sahraei | H04B 7/0639 |
| 2024/0154646 A1* | 5/2024 | Wang | H01Q 1/241 |

OTHER PUBLICATIONS

Yang et al., "Intelligent Spectrum Learning for Wireless Networks With Reconfigurable Intelligent Surfaces", Mar. 5, 2021, IEEE Transactions on Vehicular Technology, vol. 70, Issue 4, pp. 3920-3925 (Year: 2021).*

(Continued)

*Primary Examiner* — Angelica Perez
(74) *Attorney, Agent, or Firm* — Verrill Dana, LLP

(57) ABSTRACT

Provided herein are systems and methods for implementing an over-the-air neural network (OANN) including by receiving, at a relay receiver of a relay node, a signal of interest from a transmitter, directionally re-transmitting the signal of interest from each of a plurality of relay transmitters of the relay node to a corresponding one of a plurality of programmable reconfigurable intelligent surfaces (RIS), reflecting, by each of the plurality of RIS, the corresponding re-transmitted signal of interest, and adjusting, by a neural network controller, a reflection angle of each of the plurality of RIS to direct the reflected signals of interest to combine in a deterministic manner at the relay receiver.

14 Claims, 21 Drawing Sheets

(56) References Cited

OTHER PUBLICATIONS

Baoling et al., "A Deep Learning Based Modeling of Reconfigurable Intelligent Surface Assisted Wireless Communications for Phase Shift Configuration", Jan. 8, 2021, IEEE Open Journal of tee Communication Society, vol. 2, pp. 262-272 (Year: 2021).*

Elbir et al., "A Survey of Deep Learning Architectures for Intelligent Reflecting Surfaces", arXiv preprint arXiv:2009.02540, (2020), 7 pages.

Yu et al., "Optimizing Over-the-Air Computation in IRS-Aided C-RAN Systems", in 2020 IEEE 21st International Workshop on Signal Processing Advances in Wireless Communications (SPAWC), pp. 1-5, IEEE, (2020).

Restuccia et al., "DeepRadioID: Real-Time Channel-Resilient Optimization of Deep Learning-based Radio Fingerprinting Algorithms", in Proceedings of the Twentieth ACM International Symposium on Mobile Ad Hoc Networking and Computing, pp. 51-60, (2019).

Kendall et al., "Training End-to-End Analog Neural Networks with Equilibrium Propagation", arXiv preprint arXiv:2006.01981, 31 pages, (2020).

Yu et al., "An Analog Neural Network Computing Engine using CMOS-Compatible Charge-Trap-Transistor (CTT)", IEEE Transactions on Computer-Aided Design of Integrated Circuits and Systems, vol. 38, No. 10, pp. 1-11, (2018).

Wang et al., "Federated Learning via Intelligent Reflecting Surface", IEEE Transactions on Wireless Communications, pp. 1-12 (2021).

Jiang et al., "Over-the-Air Computation via Intelligent Reflecting Surfaces," in 2019 IEEE Global Communications Conference (GLOBECOM), pp. 1-6, IEEE, (2019).

Ni et al., "Over-the-Air Federated Learning and Non-Orthogonal Multiple Access Unified by Re-configurable Intelligent Surface," in IEEE INFOCOM 2021-IEEE Conference on Computer Communications Workshops (INFOCOM WK-SHPS), pp. 1-6, IEEE, (2021).

Özdogan et al., "Intelligent Reflecting Surfaces: Physics, Propagation, and Pathloss Modeling", IEEE Wireless Communications Letters, vol. 9, No. 5, pp. 1-5, (2019).

O'Shea et al., "Over the Air Deep Learning Based Radio Signal Classification," IEEE Journal of Selected Topics in Signal Processing, vol. 12, No. 1, pp. 1-13, (2018).

Wang et al., "Wirelessly Powered Data Aggregation via Intelligent Reflecting Surface Assisted Over-the-Air Computation," in 2020 IEEE 91st Vehicular Technology Conference (VTC2020-Spring), pp. 1-5, IEEE, 2020.

Ni et al., "Intelligent Reflecting Surfaces Enhanced Federated Learning," in 2020 IEEE Globecom Workshops (GC Wkshps, pp. 1-6, IEEE, 2020.

Akyildiz et al., "6G and Beyond: The Future of Wireless Communications Systems", in IEEE Access, vol. 8, pp. 133995-134030, (2020).

* cited by examiner

METHOD AND APPARATUS FOR OVER-THE-AIR NEURAL NETWORKS VIA RECONFIGURABLE INTELLIGENT SURFACES

CROSS REFERENCE TO RELATED APPLICATIONS

This application claims benefit under 35 U.S.C. § 119(e) of U.S. Provisional Application No. 63/175,114, filed on 15 Apr. 2021, entitled "Method and Apparatus for Over-the-Air Neural Networks via Reconfigurable Intelligent Surfaces," the disclosure of which is incorporated by reference herein.

STATEMENT REGARDING FEDERALLY SPONSORED RESEARCH OR DEVELOPMENT

This invention was made with government support under Grant Number 1923789 awarded by NSF National Science Foundation. The government has certain rights in the invention.

BACKGROUND

The explosive growth in wireless technology and the need for sharing scarce spectrum has resulted in many scenarios where different protocols and devices must co-exist in the same frequency bands. Given such heterogeneity in operation, there are complex challenges in authenticating legitimate devices, identifying malicious signals when they appear, and in general, gaining a holistic awareness of the ongoing activity in the spectrum band.

The above scenarios typically rely on signal analysis, whose state space is challenging to model via analytical approaches. Thus, given that wireless devices operate in environments that cannot be accurately modeled analytically or even a priori, there is significant interest in applying machine learning (ML) methods to physical layer-related problems of protocol classification, adversarial activity detection, modulation classification, RF fingerprinting, among others. Interestingly, proposed ML solutions are based on a special class of architectures called as convolutional neural networks (CNNs) that require considerable power, computing resources for training and inference, as well as incur additional latency of delivering data to a remote mobile edge computing (MEC) center. Such limitations raise many new challenges in real-time learning for wireless applications and ensure the inference decision is relayed efficiently and timely to-and-from between the field sensor and the MEC.

The computation required to run inference on CNNs that use wireless signals as inputs involves offline processing at a MEC, or specialized hardware on-site with FPGAs for real-time speedup. The former case of offloading processing to a MEC consumes additional signaling over-head to store and transmit the test data (e.g., few seconds of in-phase/quadrature (IQ) samples result in Gb-sized datasets). Additionally, it depletes the battery quickly, given the 1000× more energy cost in transmitting a bit versus processing it. Furthermore, emerging IoT deployments are ambitiously pushing the miniaturization envelope, resulting in sensors as small as 14 $mm^3$. This focus on reducing size and power demands in IoT platforms makes it infeasible to include onboard computing resources suitable for running large ML architectures. Thus, there is a need to enable (i) fast inference on trained ML architectures, and (ii) accomplish this at the sensor locations without specialized computer hardware.

Consistent with the prior art, FIG. 1 illustrates conventional CNN architecture with input data 101 in the form of raw IQ samples and digital convolution operations in software 103 that are represented in FIG. 1 as a bank of FIR filters 105.

SUMMARY

Systems and methods for over-the-air convolution are provided herein that are demonstrated as capable of providing a processing step for inference tasks in a convolutional neural network (CNN). The ambient wireless propagation environment through reconfigurable intelligent surfaces (RIS) is engineered to design such an over-the-air neural network architecture (hereinafter an "OANN"). The OANN leverages the physics of signal reflection to represent digital "convolution," a part of a CNN architecture, in the analog domain and detects this processing outcome within the received signal. Unlike classical communication where the receiver must react to the channel-induced transformation, generally represented as finite impulse response (FIR) filter, the OANN proactively creates the signal reflections to emulate specific FIR filters through RIS 309. Operating the OANN involves two steps: First, during training, the weights of the neurons in the CNN are drawn from a finite set of distinct channel impulse responses (CIR) that correspond to realizable FIR filters. Second, each such CIR is engineered by activating a different configuration of programmable RIS 309, and reflected signals naturally combine at the receiver to determine the output of the convolution step. The approach of processor-free inference for an example modulation classification task in a testbed of custom-designed RIS is experimentally demonstrated an architecture which does not (i) require signal storage (that can easily reach several GB for seconds of IQ samples), (ii) incur data forwarding latency to the edge computing server, or (iii) consume power in a dedicated processor/GPU.

In one aspect a method is provided for implementing an over-the-air neural network (OANN). The method includes receiving, at a relay receiver of a relay node, a signal of interest from a transmitter. The method also includes directionally re-transmitting the signal of interest from each of a plurality of relay transmitters of the relay node to a corresponding one of a plurality of programmable reconfigurable intelligent surfaces (RIS). The method also includes reflecting, by each of the plurality of RIS, the corresponding re-transmitted signal of interest. The method also includes adjusting, by a neural network controller, a reflection angle of each of the plurality of RIS to direct the reflected signals of interest to combine in a deterministic manner at the relay receiver.

In some embodiments, the relay receiver is an omnidirectional antenna. In some embodiments, the plurality of transmitters are directional transmitters. In some embodiments, the step of adjusting also includes operating the plurality of RIS to create the signal reflections to emulate determined finite impulse response (FIR) filters. In some embodiments, the method also includes training the OANN using weights of neurons drawn from a finite set of distinct channel impulse responses (CIR) that correspond to finite impulse response (FIR) filters realizable by the plurality of RIS. In some embodiments, each CIR is determined by activating a different configuration of the plurality of programmable RIS and the deterministic combination of reflected signals at the relay receiver is determinative of the output of a convolution step. In some embodiments, a maximum number of CIR and corresponding FIR filters implementable by the OANN is at least partially determined by a maximum number of deterministic sets of reflections producible by the plurality of RIS. In some embodiments, the maximum number of deterministic sets of reflections producible by the plurality of RIS is scalable according to a number of possible phase changes of each RIS, a number of the plurality of RIS, and a number of directional antennas at the relay node. In some embodiments, the step of adjusting also includes reconfiguring, by the neural network controller, reflection angles of the plurality of RIS to form an updated RIS configuration corresponding to a next convolutional. In some embodiments, the neural network controller is in communication with the plurality of RIS via a dedicated control plane configured to connect the relay node to the plurality of RIS. In some embodiments, the method also includes, by the neural network controller, at least one additional digital-only processing operation including at least one of a rectified linear unit (ReLu) activation, a batch normalization, a max pooling, a fully connected layer, or combinations thereof.

In another aspect, an over-the-air neural network system is provided. The over-the-air neural network system includes a transmitter system operable to transmit signals of interest. The over-the-air neural network system also includes a relay node. The relay node includes a relay receiver. The relay node also includes one or more relay transmitters. The relay node also includes a neural network controller. The over-the-air neural network system also includes a plurality of programmable reconfigurable intelligent surfaces (RIS), operable to directionally reflect signals with desired channel transformations. The relay receiver is operable to receive the signals of interest and forward the signals of interest to the one or more relay transmitters. The one or more relay transmitters are operative to forward the signals of interest to the plurality of programmable RIS. The RIS is operable to reflect the signals with desired channel transformations to the relay receiver.

In some embodiments, the RIS is operative to create the signal reflections to emulate determined finite impulse response filters. In some embodiments, a convolutional neural network trained using weights of neurons drawn from a finite set of distinct channel impulse responses (CIR) that correspond to realizable FIR filters, and each CIR is determined by activating a different configuration of programmable RIS, and reflected signals combine at the relay receiver to determine the output of the convolution step. In some embodiments, the relay receiver is an omnidirectional antenna. In some embodiments, the relay transmitters are directional antennas. In some embodiments, each RIS is a planar array of passive reflective antenna. In some embodiments, each passive reflective antenna each includes a selectable range of programmable impedance matching circuits. In some embodiments, selective activation of one or more of the programmable impedance matching circuits changes an impedance of a corresponding one of the reflective antenna. In some embodiments, changing the impedance of the corresponding one of the reflective antennas alters an antenna reflection coefficient of the corresponding reflective antenna, thereby changing a phase of the reflected signal.

Additional features and aspects of the technology include the following:

1. A method for implementing an over-the-air neural network (OANN) comprising:
   receiving, at a relay receiver of a relay node, a signal of interest from a transmitter;
   directionally re-transmitting the signal of interest from each of a plurality of relay transmitters of the relay node to a corresponding one of a plurality of programmable reconfigurable intelligent surfaces (RIS);
   reflecting, by each of the plurality of RIS, the corresponding re-transmitted signal of interest;
   adjusting, by a neural network controller, a reflection angle of each of the plurality of RIS to direct the reflected signals of interest to combine in a deterministic manner at the relay receiver.

2. The method of claim 1, wherein the relay receiver is an omnidirectional antenna.

3. The method of any of claims 1-2, wherein the plurality of transmitters are directional transmitters.

4. The method of any of claims 1-3, wherein the step of adjusting operates the plurality of RIS to create the signal reflections to emulate determined finite impulse response (FIR) filters.

5. The method of claim 4, further comprising training the OANN using weights of neurons drawn from a finite set of distinct channel impulse responses (CIR) that correspond to finite impulse response (FIR) filters realizable by the plurality of RIS.

6. The method of claim 5, wherein each CIR is determined by activating a different configuration of the plurality of programmable RIS and the deterministic combination of reflected signals at the relay receiver is determinative of the output of a convolution step.

7. The method of claim 6, wherein a maximum number of CIR and corresponding FIR filters implementable by the OANN is at least partially determined by a maximum number of deterministic sets of reflections producible by the plurality of RIS.

8. The method of claim 7, wherein the maximum number of deterministic sets of reflections producible by the plurality of RIS is scalable according to a number of possible phase changes of each RIS, a number of the plurality of RIS, and a number of directional antennas at the relay node.

9. The method of any of claims 1-8, the step of adjusting further comprising reconfiguring, by the neural network controller, reflection angles of the plurality of RIS to form an updated RIS configuration corresponding to a next convolutional.

10. The method of any of claims 1-9, wherein the neural network controller is in communication with the plurality of RIS via a dedicated control plane configured to connect the relay node to the plurality of RIS.

11. The method of any of claims 1-10, further comprising, by the neural network controller, at least one additional digital-only processing operation including at least one of a rectified linear unit (ReLu) activation, a batch normalization, a max pooling, a fully connected layer, or combinations thereof.

12. An over-the-air neural network system comprising:
   a transmitter system operable to transmit signals of interest;
   a relay node comprising:
   a relay receiver,
   one or more relay transmitters, and
   a neural network controller; and
   a plurality of programmable reconfigurable intelligent surfaces (RIS), operable to directionally reflect signals with desired channel transformations;
   wherein the relay receiver is operable to receive the signals of interest and forward the signals of interest to the one or more relay transmitters, the one or more relay transmitters are operative to forward the signals of interest to the plurality of programmable RIS, and the RIS is operable to reflect the signals with desired channel transformations to the relay receiver.

13. The system of claim 12, wherein the RIS is operative to create the signal reflections to emulate determined finite impulse response filters.

14. The system of claim 13, comprising a convolutional neural network trained using weights of neurons drawn from a finite set of distinct channel impulse responses (CIR) that correspond to realizable FIR filters, and each CIR is determined by activating a different configuration of programmable RIS, and reflected signals combine at the relay receiver to determine the output of the convolution step.

15. The system of any of claims 12-14, wherein the relay receiver is an omnidirectional antenna.

16. The system of any of claims 12-15, wherein the relay transmitters are directional antennas.

17. The system of any of claims 12-16, wherein each RIS is a planar array of passive reflective antenna.

18. The system of claim 17, wherein each passive reflective antenna each includes a selectable range of programmable impedance matching circuits.

19. The system of claim 18, wherein:
   selective activation of one or more of the programmable impedance matching circuits changes an impedance of a corresponding one of the reflective antenna;
   changing the impedance of the corresponding one of the reflective antennas alters an antenna reflection coefficient of the corresponding reflective antenna, thereby changing a phase of the reflected signal.

DETAILED DESCRIPTION

Figure 1:
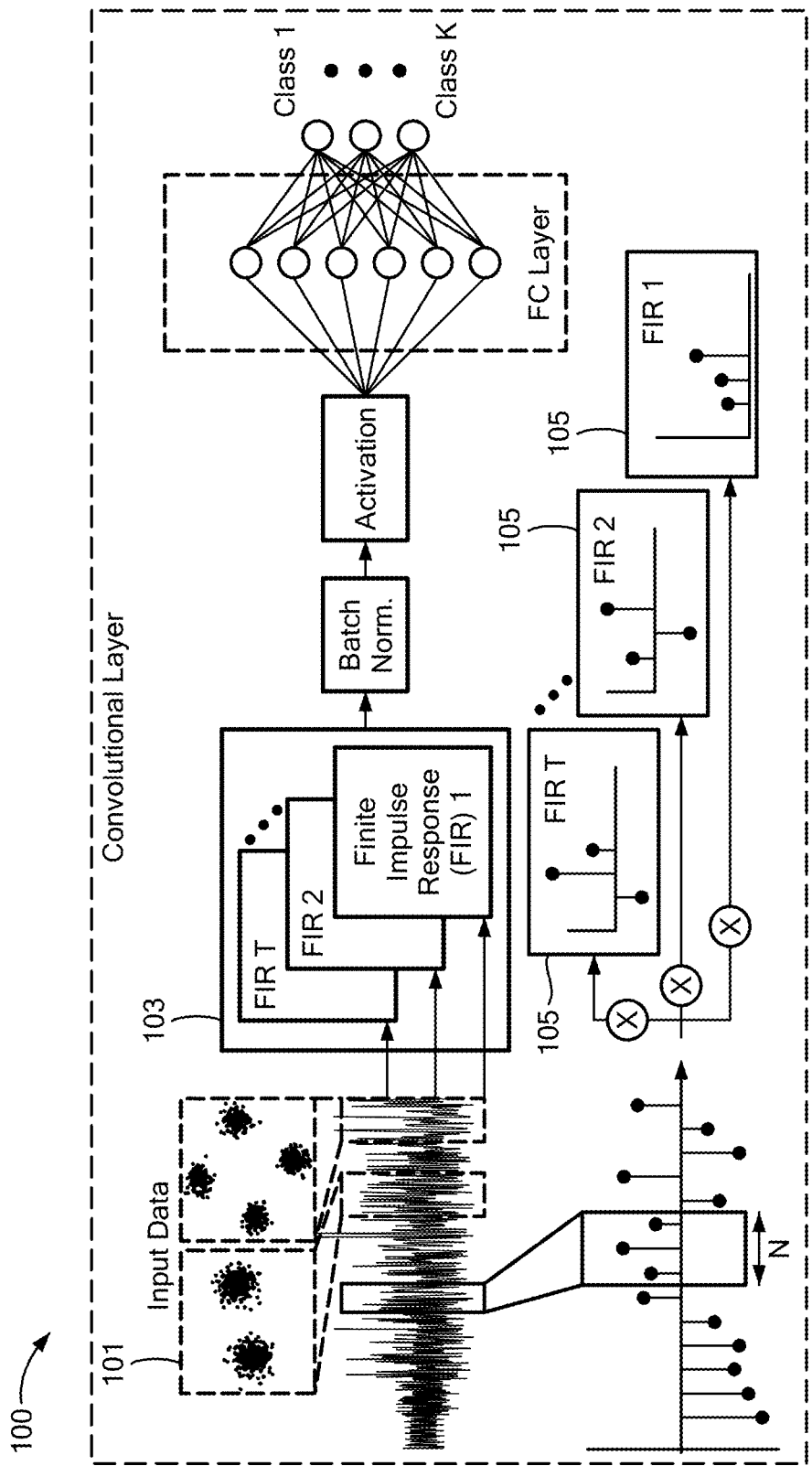
FIG. 1 is a functional schematic illustrating a conventional CNN architecture in accordance with the prior art.

As noted above, in order to achieve significant gains in reducing size and power demands in IoT platforms, it is infeasible to include onboard computing resources suitable for running large ML architectures.

The technology described herein provides a different solution by shifting the burden of executing the CNNs architecture from dedicated digital devices into the ambient environment, thereby facilitating (i) fast inference on trained ML architectures, and (ii) achievement of such fast inference at the sensor locations without specialized computer hardware.

This can be achieved by implementing the core functional block of a CNN in the analog domain. Several copies of a transmitted wireless signal interact with a carefully shaped propagation and reflection environment to emulate the mathematically equivalent outcome of passing the signal through a digital convolution filter present in a CNN. This step happens over-the-air and in real-time, and thus, the resulting ML architecture is denoted herein as an "OANN." The signal that needs to be analyzed, e.g., in the task for modulation classification, is transmitted over the air and is modified through successive reflections by reconfigurable intelligent surfaces (RIS). Once all these signals combine, the cumulative effect at a receiver resembles the processing of the same input signal as if it passed through a convolutional layer of a CNN.

While the domain of analog computing has existed for over a decade, combining wireless signals to emulate a digital convolution operation (and by extension, a CNN) has not been attempted before. An over-the-air convolution is provided herein that is demonstrated as a processing step for inference tasks in a convolutional neural network (CNN). The ambient wireless propagation environment through reconfigurable intelligent surfaces (RIS) is engineered to design such an over-the-air neural network architecture, called an "OANN" herein. The OANN leverages the physics of signal reflection to represent digital "convolution," a part of a CNN architecture, in the analog domain and detects this processing outcome within the received signal. Unlike classical communication where the receiver must react to the channel-induced transformation, generally represented as finite impulse response (FIR) filter, the OANN proactively creates the signal reflections to emulate specific FIR filters through RIS 309. Operating the OANN involves two steps: First, during training, the weights of the neurons in the CNN are drawn from a finite set of distinct channel impulse responses (CIR) that correspond to realizable FIR filters. Second, each such CIR is engineered by activating a different configuration of programmable RIS 309, and reflected signals naturally combine at the receiver to determine the output of the convolution step. The approach of processor-free inference for an example modulation classification task in a testbed of custom-designed RIS is experimentally demonstrated an architecture which does not (i) require signal storage (that can easily reach several GB for seconds of IQ samples), (ii) incurs data forwarding latency to the edge computing server, and (iii) consumes power in a dedicated processor/GPU.

Signal Routing and System Hardware

Figure 2:
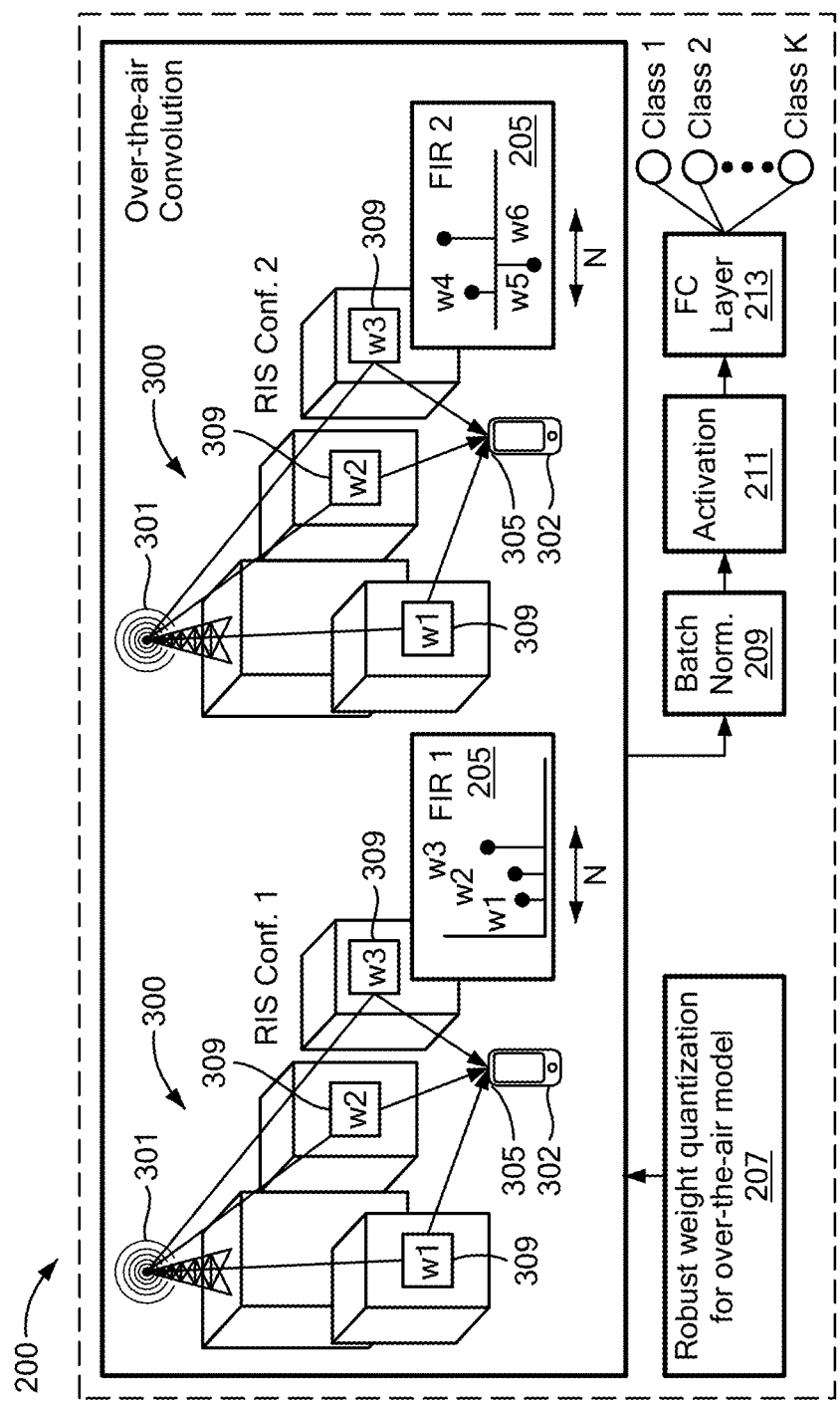
FIG. 2 is a functional schematic illustrating an OANN architecture in accordance with various embodiments.
Figure 3:
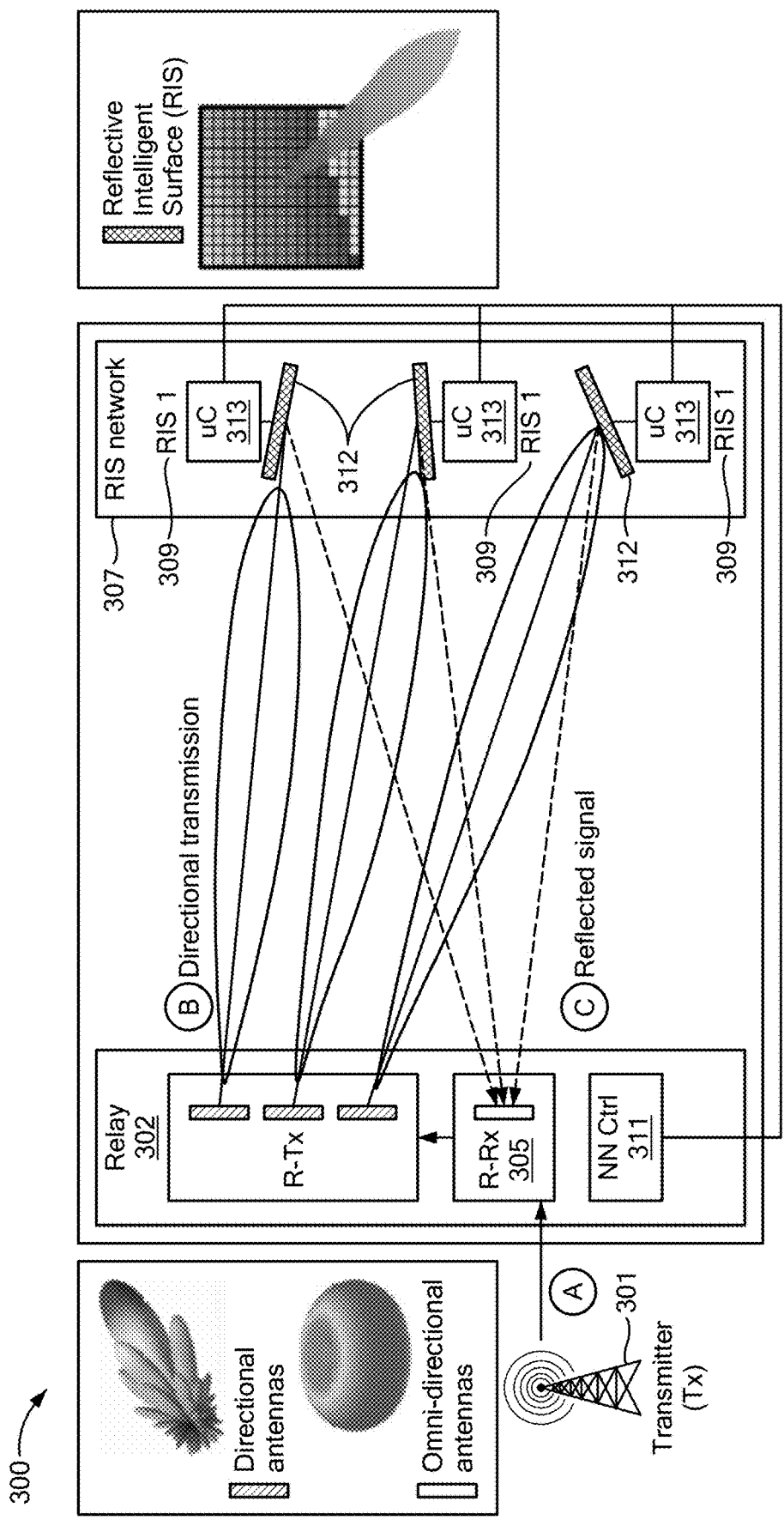
FIG. 3 is a functional schematic illustrating components and transmission sequences of the OANN system in accordance with various embodiments.

Previous work has shown how an RIS can help improving the communication link between a transmitter (Tx) and a receiver (Rx), from amplifying the received signal through the method of beamforming, to improving resiliency to deep fading conditions by inducing spatial diversity. Instead, as shown in FIGS. 2 and 3, in the OANN 200 an over-the-air convolution is performed by the OANN architecture by making use of a network 307 of programmable RIS 309 and a relay node 302. The relay node 302 receives the incoming signal from a Tx 301 as shown by link A using an omnidirectional receive antenna (R-Rx) 305. Following this, the relay 302 forwards that same signal using directional antennas R-Tx 303 (shown by link B) towards specific RIS 309 in a network of RIS 307. At the same time, a neural network controller 311 adjusts the reflection angles of reflective surfaces 312 of different RIS 309 to ensure that the reflected signals (shown by link C) combine in a deterministic manner at the receiver antenna R-Rx 305 of the relay 302. Thus, the signals shaped by the RIS 309 emulate the outcome of a digital convolution at the receiver antenna R-Rx 305 of the relay 302.

Referring now to FIGS. 2 and 3, in the OANN 200, the weights of a neural network are quantized 207 considering real system constraints. Those are dictated by the set of reflections that the network of RIS 307 can generate, and thus the set of realizable FIR filters 205 that the OANN system 300 can implement over-the-air. The neural network controller 311 within the relay 302 in the OANN system 300, is tasked to train the OANN 200 while conceiving these restrictions. During inference, the neural network controller 311 notifies the RIS network 307 with the updated RIS 309 configuration, (e.g., an RIS configuration that leads to a desired convolutional) using a dedicated control plane that connects the relay 302 to microcontrollers 313 of the individual RIS 309. After the convolution step is completed (or after multiple such iterations of engineered reflections are performed, as required by the convolutional layers), the neural network controller 311 carries the additional digital-only processing operations 209, 211, 213, such as, for example, rectified linear unit (ReLu) activation 211, batch normalization 209, max pooling and the fully connected layer 213. For the example case of modulation classification, the original signal of interest from the Tx 301 is re-transmitted by the directional transmitters (R-Tx) 303 of the relay 302 and received back after the RIS 309 reflections. The relay 302 then continues through with the subsequent steps in the digital domain and predicts the modulation class at the output of the final fully connected layer 213.

In a given CNN, the convolutional filters are learned during the training process. These filters activate the neurons when a specific feature of interest is detected during testing. For 1-D inputs to the CNN, typical for streaming IQ samples from a wireless signal, these filters can be represented as an FIR of length N (that is, N taps), filter order L=N−1. This filter is essentially a vector of N complex weights, each weight defining a specific amplitude and phase of that particular filter tap. As an example, consider the output of a filter of length N in Eq. 1, where $w=\{w_0, w_1, \ldots, w_{N-1}\} \in C$ are the complex weights that are applied to the incoming stream of samples. The filter order L also gives the number of input samples needed to generate a single sample at the output.

$$y[n] = w_0 * x\left[n + \frac{L}{2}\right] + \ldots + w_{\frac{L}{2}} * x[n] + \ldots + w_L * x\left[n - \frac{L}{2}\right] \quad (1)$$

Through hundreds of iterations in a typical training process for a CNN, the final vector w, is obtained, which is sensitive to discriminative features present within the signal.

A goal is to artificially construct a signal transformation in the physical environment during testing that precisely maps to the above vector w that was obtained during training time. The fact can be leveraged that when a signal is transmitted over the air, the reflections from the objects and surfaces in the environment cause copies of the same signal to arrive at the receiver with different amplitude, phase, and time delays, collectively referred to as multipath. This phenomenon is characterized by the CIR, where each path is defined by the tuple of complex transformations in amplitude and phase and the instant arrival at the receiver. In the digital domain, the multipath results in an FIR filter of order N−1, where N is the total number of paths that give rise to copies of the signal at the receiver. Here, the first path is associated with the Line of Sight (LoS) component, whereas the N−1 later paths arise from Non-Line of Sight (NLoS). This analogy between analog and digital forms of convolution is useful in the development of the OANN.

Each RIS 309 is a planar array of passive reflective antennas 312, and each such antenna has a selectable range of impedance matching circuits. These circuits are programmable, and by activating one over the others, the impedance of the corresponding reflective antenna 312 can be changed. This alters the antenna reflection coefficient, which then changes the phase of the reflected signal. The RIS-guided reflections allow flexibility in imparting the desired complex-valued amplitude and phase changes to the signal. However, the set of candidate options is limited. In particular, the feasible codebook is constrained by the number of available RIS 309, the selectable circuit combinations within each RIS 309 reflective antenna 312 array, and the geometry of the propagation environment. Since a single RIS 309 contributes one "path" or complex-valued transformation to the signal, the number of active RIS 309 must equal the number of taps of the FIR filter 205 used in the OANN 200.

As described herein, the OANN 200 relies on representing a convolutional filter of size N in a CNN as an N-tap FIR filter 205. This construction permits the OANN 200 to advantageously achieve the analog processing described herein. However, because the OANN 200 leverages the mathematical equivalence between the latter and the N tap discrete version of the CIR, several limitations and requirements must be addressed. First, CIR depends on the transmitted signal and the multipath components of the environment, which the RIS 309 can influence to a significant extent, but not perfectly. The technology provides an efficient optimization loop: Not only must the RIS 309 be programmed to generate very precise CIR values, but also a CNN must be trained with quantized weights drawn from a very limited candidate set that correspond to the feasible CIR set. This mapping deviates overtime as wireless channel conditions change, and repeatable conditions must be engineered during testing while accommodating ambient factors that cannot be controlled. Second, from a systems viewpoint, a network of programmable, low-cost RIS 309 must be created that is time-synchronized and responds to control directives to change its reflection ability. Finally, the experimentally implemented OANN 200 should demonstrate accuracy comparable to its all-digital CNN running on a GPU. In that regard, there are also several design goals for practical systems-level realization described as follows:

Complex-Valued Convolutions: Complex numbers are used jointly to represent amplitude and phase information in the RF domain. Thus, mapping real-valued convolutional layer filters to the complex-valued channel impulse response is not feasible. Only complex-valued neural networks can be used.

RIS-Based Weight Constraints: The number of possible FIRs 205 that can be engineered via RIS 309 is limited, although it scales with the number of possible phase changes, the number of RIS 309, and the number of directional antennas 303 at the relay 302. In the digital domain, this constrains the set of feasible FIR filters that can be used during the training of the CNN. Thus, the OANN 200 must involve a step of quantizing the CNN weights that correspond to only possible, (RIS-realizable) FIR filters.

Receiver Noise: Even if the channel remains time-invariant and the RIS 309 configuration is static, there exists thermal noise originated at the receiver that is statistically independent of the signal. This stochastic noise can be accounted for, especially as the reflected signals are low in amplitude and barely above the noise floor. This can be achieved for additive white Gaussian noise via a correction factor, as explained herein.

RIS-Path Separation: The FIR filter 205 taps that can be obtained through the OANN 200 must be equally spaced in time, as is also assumed in the digital version. In the wireless domain, this is challenging as the arrival time of the signal depends on separation distances and the sampling rate. The OANN 200 addresses this via a multi-antenna relay 302 (where R-Tx 303 has three elements) that ensures sufficient path separation along with a custom-designed RIS 309 whose reflected signal phase is adjustable.

Meaningful CIR Variations: The LoS path dominates over the NLoS paths resulting from RIS reflections in terms of received signal strength, and thus, can be the highest contributor to the CIR. To ensure that the artificially constructed NLoS paths shape the CIR precisely (despite the overbearing LoS path), directional antennas are used at the relay R-Tx 303.

Channel Variations: If the wireless channel changes, then the prior configured RIS 309 may still generate an older and outdated CIR. To ensure real-time response and prevent re-training the neural network and/or re-configuring the RIS 309, the OANN 200 compensates for channel variations from a pre-determined baseline.

Precise Synchronization: Given the concise time window to achieve convolution, each transmitter antenna must adjust the start times to achieve microsecond-level synchronization for Mbps-level data rate. Furthermore, long symbol times can disrupt the system as the CIR may change beyond the estimated value, while a short symbol time requires high timing accuracy. The OANN 200 solves this problem by adaptively padding the relay-transmitted sequence at the R-Tx 303 with zeroes to achieve precisely one sample delay between any two successively arriving signals.

To facilitate the mapping between the neural network weights and the RIS-engineered CIR, a neural network model can be designed based on complex-valued data and weights. Given that the convolution operator (*) is distributive, the output of a complex convolutional layer can be expressed as $y_{conv} = x_R * w_R - x_I * w_I + j(x_R * w_I + x_I * w_R)$ where $y_{conv}$ is the output of the complex convolution, x and w represent the input and the weights of the convolutional layer. $x_{R/I}$ and $w_{R/I}$ are the real/imaginary parts of x and w, respectively. Equivalently, the output of a complex-valued fully connected layer can be expressed as $y_{FC}^o = \sum_{i=1}^{N_{in}} x_R \times w_R^{o,i} - x_I \times w_I^{o,i} + j(x_R \times w_I^{o,i} + x_I \times w_R^{o,i})$ where $y_{FC}^o$ is the output of neuron o, $w^{o,i}$ is the weight of the edge from input i to output o and $N_{in}$ the number of input neurons. It can be observed that both the convolutions (i) for the convolutional layers and (ii) the product-sum for the fully connected layers can be decomposed using the distributive property of these operations. Thus, the output y of a complex layer $\phi$ (convolutional, fully connected) with complex weights w ($\phi_w$) can be expressed as $y = \phi_{w_R}(x_R) - \phi_{w_I}(x_I) + j(\phi_{w_I}(x_R) + \phi_{w_R}(x_I))$. Complex-valued layers ($\phi_w$) can be implemented using two real-valued layers, where each one of them will independently represent the real ($\phi_{w_R}$) and imaginary parts ($\phi_{w_I}$).

A quantization-enabled approach can be used to train the neural network with the set of feasible weights provided by the RIS-engineered environment. Let the weights of a complex convolution layer be $W = \&\{w_1, \ldots, w_F\}$, $w_f = \&[w_f^1, \ldots, w_f^N]$ with $w_f \in C^N$, $w_f^n \in C$ and where W is the set of F FIR filters ($w_f$) with length N that represent the layer weights. The OANN has limited freedom in implementing an over-the-air FIR filter. Therefore, the weights $w_f^n$ for each filter tap with index n can be constrained to a candidate set $S_n$ of implementable values, defined as $S_n = \{c_1^n, \ldots, c_s^n, \ldots, c_{|S_n|}^n\}$ with $C_s^n \in C$, $1 < n < N$. $|S_n|$ is the size of the constrained set and $c_s^n$ represents each of its complex-valued elements. During training, the Euclidean distance (D) is computed from every individual weight $w_f^n \in W$ to all weight candidates $C_s^n \in S_n$. Then, the nearest neighbor of $w_f^n$ is defined as:

$$w_f^{n'} = \underset{c \in S_n}{\operatorname{argmin}} D(c, w_f^n) \qquad (2)$$

While training the model, weight values $w_f^n$ are rounded to their nearest neighbors $w_f^{n'}$ to perform forward propagation, following Eq. 2. However, the derivative of the rounding function is zero throughout and cannot be trained via classic backpropagation. This can be solved by employing the Straight Through Estimator (STE) approach, which assumes the derivative of the discrete rounding function to be 1. While other approaches based on ADMM have also been proposed, STE is selected due to its faster training and convergence. Then, the forward and backward propagation steps can be expressed as:

Forward: (3)

$$L = \phi_{w'}(\text{input});$$

Backward:

$$\frac{\partial L}{\partial w} = \frac{\partial L}{\partial w'}$$

where L can be any form of loss function. Here, the gradient of w is approximated to the gradient of W', which is the fundamental working principle of STE.

The receiver 305 introduces thermal noise that causes random variations, denoted henceforth as $\epsilon \in \mathbb{C}$, into the RIS-implemented CIR. Such CIR variations follow a Gaussian distribution with standard deviation a. That is, $\epsilon \sim \mathcal{CN}(0, \sigma^2)$. Due to noise and changing wireless environment, the current CIR may have a mismatch with the filters identified by the RIS 309, and yet it is desirable that the CNN be robust without appreciable fall in accuracy. In order to solve this problem, Eq. 2 is modified by adding the term E, as given below:

$$w_f^{n'} = \underset{c \in S_n}{\arg\min} D(c, w_f^n) + \epsilon \quad (4)$$

As opposed to previous data augmentation approaches, the variable $\epsilon$ is applied during training directly to the weights to increase the robustness of the model as well as during testing. In each forward propagation step, weights are first quantized to the target constraint and noise is added. As mentioned previously, STE is employed to approximate gradients for w, such that w is updated via Stochastic Gradient Descent (SGD).

The straightforward implementation of FIR filter taps in the CNN requires (i) constant inter-path time arrivals from consecutive RIS paths. That is, $t_{RIS_{i+1}} - t_{RIS_i} = \Delta_t$, $\forall i \in [0, \ldots N-1]$, and (ii) these inter-path time arrivals need to exactly match the communication symbol time. That is, $\Delta_t = T_s$. Here, the first condition imposes a hard constraint on the physical deployment of RIS 309 in the environment, forcing all RIS paths to have the same length. To correct the path differences, the OANN 200 accommodates a software-based temporal adjustment over the transmitted frames. The second condition requires sampling rates (Fs=1/Ts) that may not be compliant with the expected rate at the relay receiver R-Rx 305. For example, for a total separation of 2 m between two signal paths, the arrival time difference is 66.7~ns, which needs a sampling rate of up to 150 MS/s. The OANN 200 solves this via a multi-antenna system at the R-Tx 303, where each relay antenna transmits the signals with a time delay of precisely one sample with respect to the next. This approach maintains precise control in time to generate over-the-air convolution with equal spacing between arriving signals at the R-Rx 305. For instance, with Fs=1 MS/s, a convolution output sample per microsecond is created if all signal paths are equal in traversed distance.

While the multi-antenna R-Tx 303 ensures fine-grained temporal separation of the signal paths, an omnidirectional transmission can also be reflected from multiple existing scatterers (unlike the programmable RIS 309) present in the environment. This significantly complicates the ability to generate and control the desired CIR (the exact complex weights). Moreover, the signal reflections from the RIS 309 are considerably weak. For example, for an omnidirectional transmission, the received signal from a RIS 309 is roughly dropping at least 10 dB. Such low values also significantly reduce the amplitudes for the FIR filter taps, especially in contrast to the dominant LoS path amplitude, making it challenging to map the physical environment to the digital values. In order to study this problem, the delay profile can be formally expressed in a setup with a single antenna R-Tx 303, single antenna R-Rx 305 and N RIS 309 as:

$$S(t) = (P_t - L_{LoS})\delta(t_{LoS}) + \Sigma_{i=1}^{N}(P_t - L_{RIS_i})\delta(t_{RIS_i}) \quad (5)$$

with $P_t$ (dBm) as the transmitted power. $L_{LoS}$ and $L_{RIS_i}$ (dB) are the losses for the LoS path and the $i^{th}$ RIS path, $i = \{1, 2, \ldots, N\}$, respectively. Following the interpretation of a given RIS 309 as an array of diffuse reflective antenna 312, and considering that each RIS 309 is formed by M such antennas, $L_{RIS_i}$ can be estimated from:

$$L_{RIS_i} = 10 \log |\Sigma_{m=1}^{M} l_{RIS_i^m} e^{j\phi_i^m}| \quad (6)$$

where $l_{RIS_i^m}$ represents the path loss associated with a particular reflective antenna 312 $m$. This loss value depends on the carrier frequency, the distance between R-Tx 303 to RIS 309 and RIS 309 to R-Rx 305, RIS dimensions, transmitter and receiver antenna gain in the direction of each reflective antenna 312, and the angle of incidence of the signal wavefront to the RIS plane. The term $e^{j\phi_i^m}$ in Eq. 6 represents the phase of the incoming signal from RIS 309 element m to the receiver, and thus, the received power is determined by the interference of the incoming signal from all m = [1, 2, ..., M] reflective antenna 312 of the RIS 309. The phase $\phi_i^m$ is given by $\phi_i^m = k (d_{(R-Tx,i^m)} + d_{\{(i^m, R-Rx)\}}\%+d_{FF_i^m} + \phi_{S_i^m}$ with $$k = \frac{2\pi}{\lambda}$$

as the wave number, $\lambda$ as the wavelength and finally, $d(R-Tx,_i^m)$, $d_{\{(_i^m, R-Rx)\}}$ represent the distance from R-Tx 303 to reflective antenna 312 and from that same antenna 312 to R-Rx 305, respectively. The term $\phi_{S_i^m}$ gives the configurable phase shift introduced by the reflective antenna 312 M. Importantly, the estimation of $l_{RIS_i^m}$ follows a product-distance path loss model, where the power decays with $d_{(R-Tx,_i^m)} d_{\{(_i^m, R-Rx)\}} \sim d^2$ in contrast to d, in conventional beamforming. The term $L_{LoS}$ in Eq. 5 can be estimated from the Friis equation and the delay terms $\delta(t_{LoS})$ and $\delta(t_{RIS_i})$ obtained by dividing the known distances with c, the speed of light in vacuum. Thus, the CIR component associated to the RIS i path can be estimated as:

$$h_i = \sqrt{l_{RIS_i}} \sum_{m=1}^{M} e^{j\phi_i^m}$$

Due to the non-stationarity of wireless channels, unintended signals due to by ambient scatters may be present during the RIS 309 configuration. Thus, the CIR engineered by the RIS 309 may not result precisely in the weights corresponding to the digital convolution unless the CNN architecture is re-trained for every new scattering profile. Instead, the OANN 200 uses a channel tracking and correction stage to ensure that the weights of the CNN, as decided by the RIS configuration, remain valid even under new channel conditions. This ensures that the received signal at the R-Rx 305 always experiences a fixed and constant phase of zero degrees and unit magnitude when using the baseline configuration at every RIS 309.

An orchestrating software framework runs a server thread as the master controller in the neural network controller 311 module in the relay 302 and a client-thread in each microcontroller 313 associated with a RIS 309. The orchestrating software framework has two primary functions: (i) perform signal processing steps related to the rest of the CNN architecture, other than the convolution step, leading to the final classification outcome, and (ii) control and reconfigure the individual RIS 309. Within the relay, the orchestrating software framework spawns three different processes in parallel, each associated with the actions of the R-Tx 303, R-Rx 305, and neural network controller 311.

Transmission/reception sequence: The orchestrating software framework server thread runs in a persistent loop within the relay 302. First, it waits to receive signals of interest from the Tx 301 node that need to be analyzed (this could be any wireless device outside of the OANN system 300). The SDR1 associated with R-Rx 305 collects IQ samples and forwards them to the Coarse synch block that performs basic energy detection. If the signal strength exceeds a threshold, it interprets that the resulting signal is from a Tx 301 that needs to be analyzed. This triggers the start of OANN relay actions. At this stage, the Coarse synch module redirects the incoming IQ samples to the associated R-Tx 303 thread, which in turn processes the samples for OANN operation and then re-transmits over the air. At this time, the coarse synch switches its active output port to forward the incoming samples resulting from the over-the-air convolution to the processing blocks within the R-Rx 305. After fine-grained synchronization at the R-Rx 305, samples are fed to the neural network controller to complete the CNN processing and obtain the predicted class through the neural network.

Pre-processing at the R-Tx: The R-Tx 303 generates a set of orthogonal Gold sequences (GS) that have desirable properties of good auto- and cross-correlation, and uniquely assigns one sequence to the set of IQ samples being sent over each transmit antenna. Thus, a transmission from the relay is composed of a GS appended to the received samples from the Tx 301. The benefit of using GS is two-fold: On the one hand, GS guarantees precise time synchronization for generating paths-delays that match the temporal distribution of desired FIR filters (see Sec. 5.1). On the other hand, GS offers a way to estimate and compensate for the channel variations overtime.

Figure 10A:
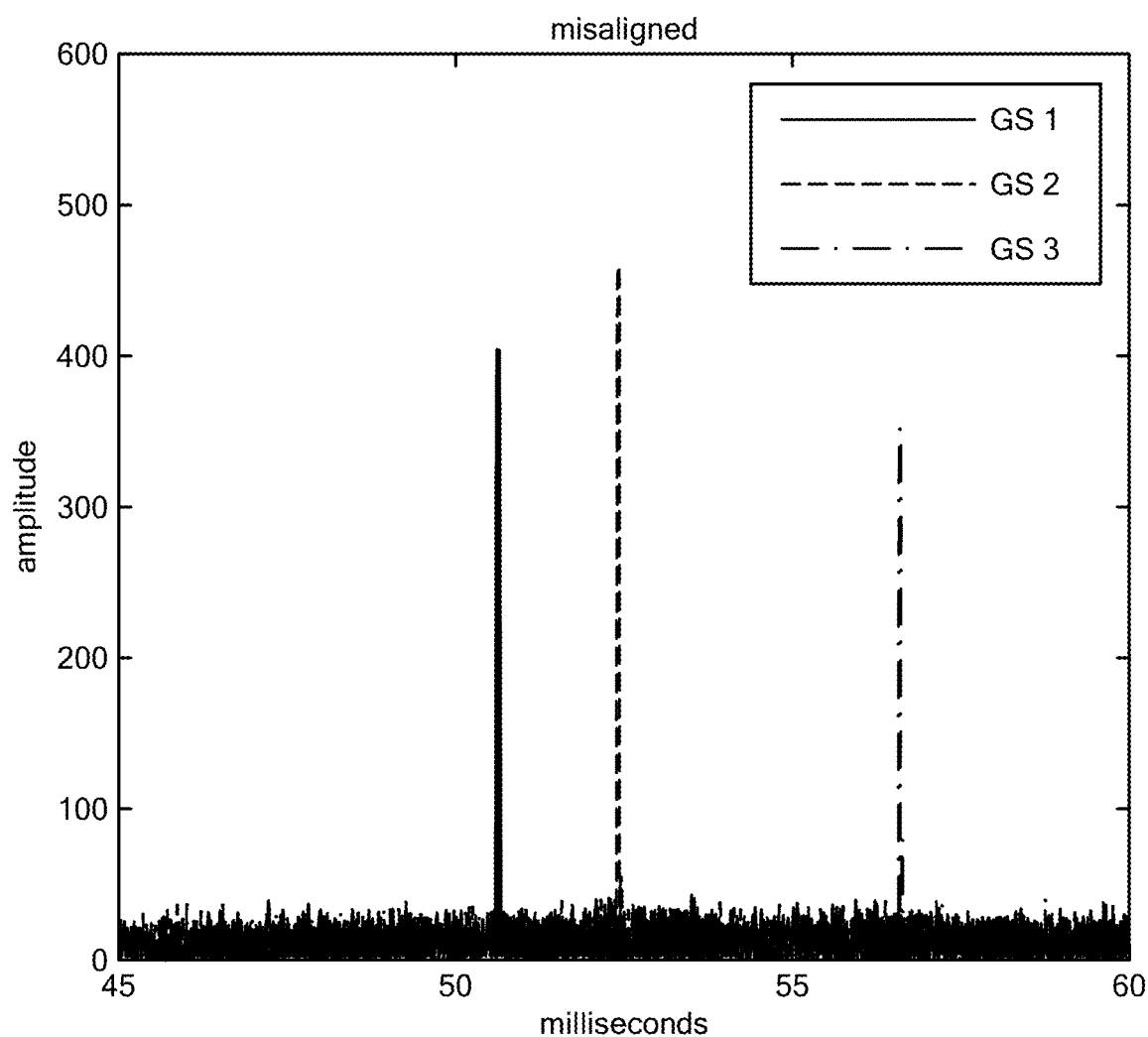
FIG. 10A illustrates precise synchronization at the R-Tx with misaligned inter-RIS path arrivals in accordance with various embodiments.

Synchronization and channel estimation at the R-Rx: Although the SDRs in the relay R-Tx 303 start their transmission sat the same PPS instant, the OANN requires more fine-grained precision to realize the desired filter taps (FIG. 10a). To achieve this, the R-Rx 305 computes the symbol misalignment between all the transmit streams via the GS by setting the last received stream as a reference. It then sends back this information along with the channel state information or CSI (Channel estimation computed in the R-Rx 305) to the R-Tx 303. The SDRs in the R-Tx 303 delay their signals with additional zero-padding to sync with other peer-transmitters. Only with accurate time alignment (FIG. 10b) can the OANN generate the desired temporal displacement by deferring transmissions precisely by one sample with respect to other transmitters.

DETAILED DESCRIPTION OF EXPERIMENTAL EMBODIMENTS

FIG. 2 illustrates the OANN 200 and shows an expanded view of how the OANN system 300 having the RIS network 307 is able, over-the-air, to perform the same convolution operation performed by software in FIG. 1.

As shown in FIG. 2, the OANN 200 includes a transmitter 201 for transmitting a signal of interest (e.g., the IQ samples shown in FIG. 1), a plurality of RIS 309 for directionally reflecting the transmitted signal of interest, and a receiver 305 of a relay node.

FIG. 2 illustrates an example processing chain where raw in-phase/quadrature (IQ) samples are fed to the neural network having a convolution layer, followed by a fully connected layer that outputs class predictions. FIG. 2 shows two configurations of RIS 309 that give rise to two different desired CIRs, each of which acts as an individual FIR filter 205 convolving with the transmitted signal. The filter representation can be made to exactly match the filters learned during training a classical, digital CNN.

Different RIS 309 configurations result in specific channel transformations equivalent to the convolution operation shown in FIG. 1.

FIG. 3 illustrates OANN system 300 components executing an OANN 200 transmission sequence. External device Tx 301 transmits the signal of interest. The relay node 302 captures this signal and uses antennas (R-Tx 303) to forward it to the network 307 of programmable RIS 309 controlled via the neural network controller module 311. The RIS 309 reflect the signal with desired channel transformations to the relay's 302 antennas (R-Rx 305). The remaining steps of activation, normalization, and processing within fully connected layers occur in the neural network controller module 311.

Figure 4A:
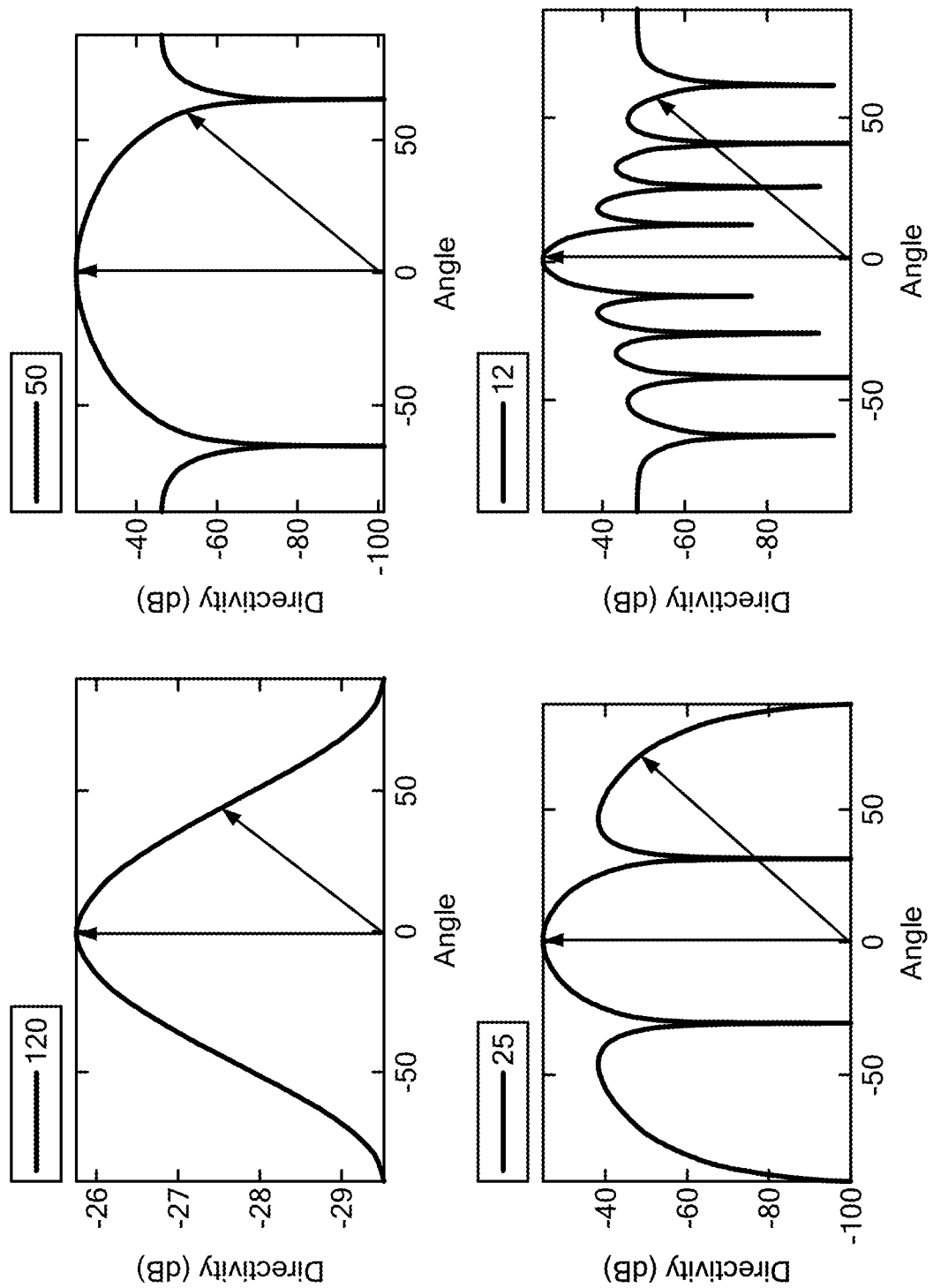
FIG. 4A illustrate antenna directivity of an RIS-to-LoS configuration in accordance with various embodiments.
Figure 4B:
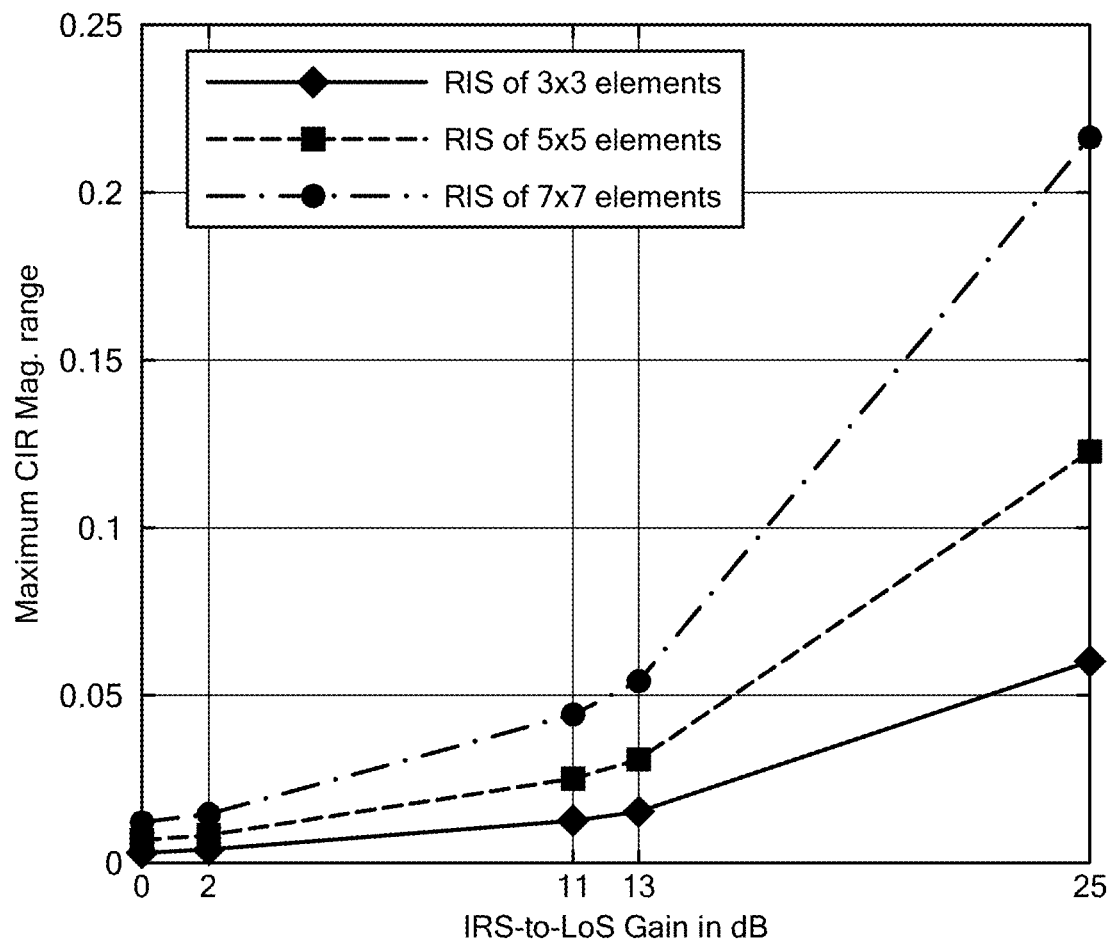
FIG. 4B illustrate achievable CIR magnitude of an RIS-to-LoS configuration in accordance with various embodiments.

FIG. 4A illustrates antenna directivity and FIG. 4B illustrates achievable CIR magnitude of an RIS-to-LoS configuration. Higher antenna directivities tend to lead to higher RIS-to-LoS power ratios (difference between blue and red arrows), which translates into (b) higher achievable CIR magnitude range, as the LoS component does not neglect the RIS contribution. In FIG. 4B, the simulated maximum range for the magnitude of the received signal given in Eq. \ref{eq:CIRtheory} is shown as a function of the RIS-to-LoS power ratio, for different levels of directivity of the transmitter antenna radiation pattern, shown in FIG. 4A, as defined by their respective 3-dB beamwidth $BW_{3dB}=\{360°, 120°, 50°, 25°, 12°\}$ and different number of antenna elements with $M=\{49, 36, 25, 9, 4\}$. In FIG. 4A, the vertical arrow points to the RIS 309, while the angled arrow points directly to the receiver 305, located at 45° from the RIS 309 direction. It can be observed that for low antenna directivity, the high power of the LoS component compared to that of the signal reflected from the RIS 309 renders any manipulation of the RIS 309 ineffective.} Hence, the OANN 200 uses directional antenna elements that (i) boost the power of the reflected signals from the RIS paths and (ii) mitigate the degrading impact of the LoS signal along with the effect of additional ambient scatterers not controlled within the OANN 200.

Figure 5A:
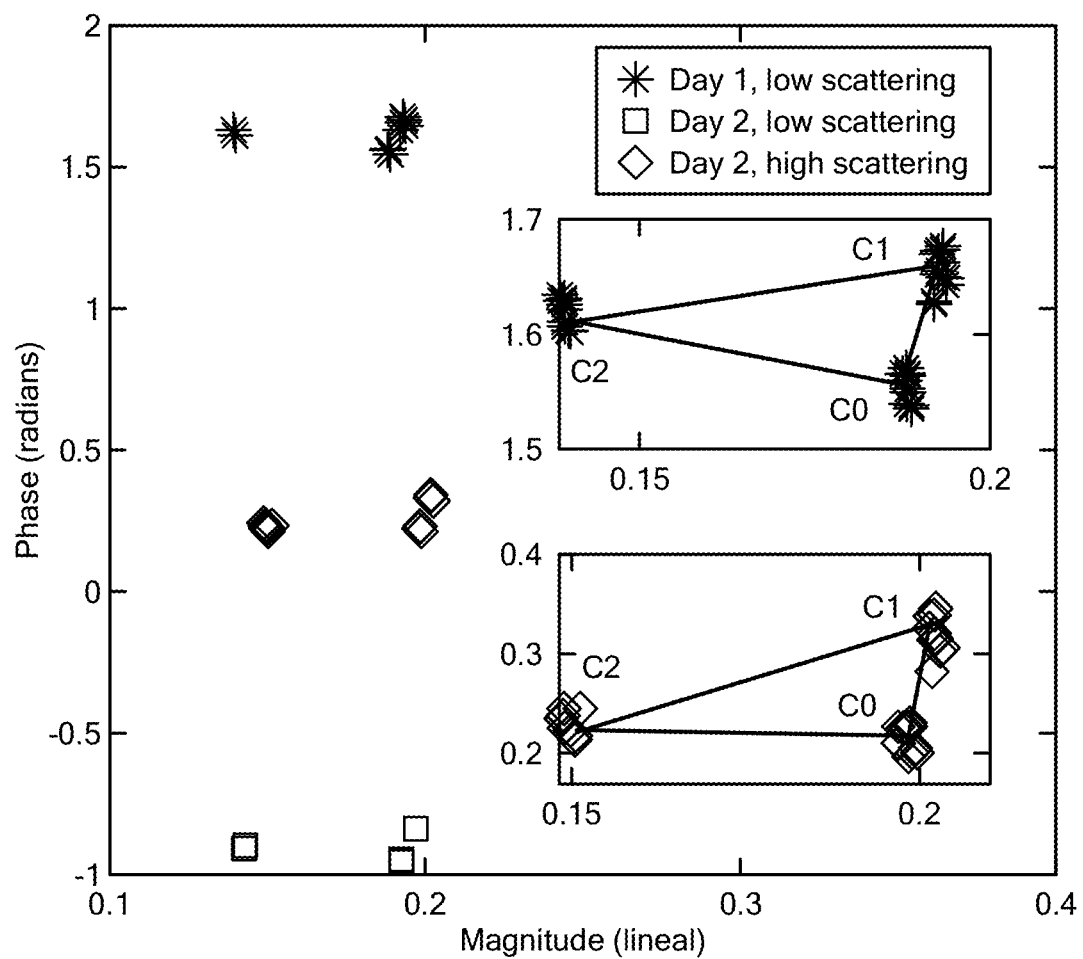
FIGS. 5A and 5B illustrate magnitude and phase of CIR according to different scattering profiles in accordance with various embodiments.
Figure 5B:
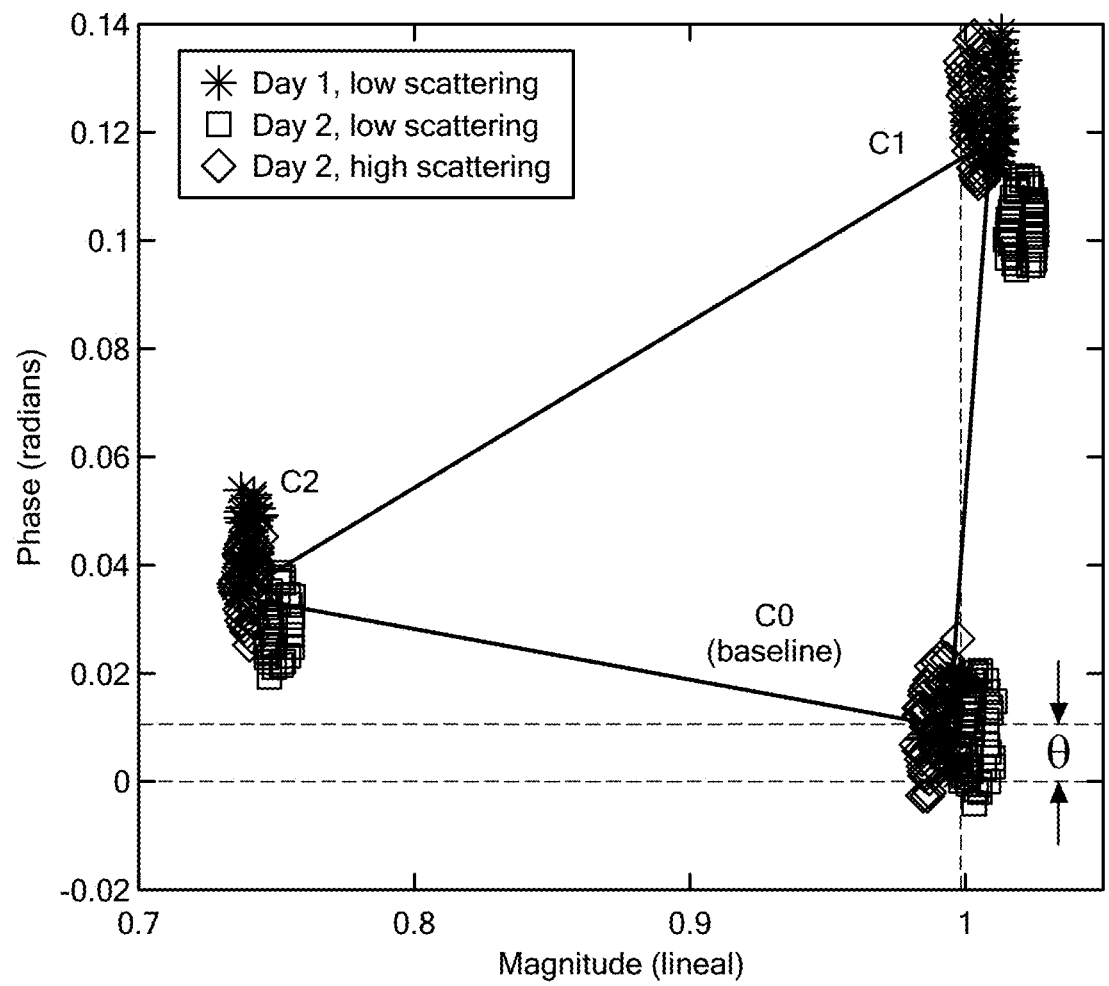

FIGS. 5A and 5B illustrate magnitude and phase of CIR according to different scattering profiles. FIG. 5A illustrates measured CIR using a single RIS 309 with three phase configurations (C0, C1, and C2) under varying scattering profiles. A relatively similar relative distance can be observed between the magnitude and phase plot of the CIR for three configurations for these different scattering profiles. FIG. 5B illustrates how the OANN 200 adapts to varying conditions using LS equalization with respect to a priori chosen baseline C0. The process in the figure is as follows: First collect signal samples using the standard OANN 200 relay 302 setup. Then compute the phase rotation for three RIS 309 configurations, C0, C1, and C2, on two different days and scattering profiles. These profiles include cases of low impact (few meters away) and high impact (few cm away) scatterers, respectively. Use Least Squares channel estimation with a known preamble sequence. Since directional transmissions at R-Tx 303 mitigate the multipath effect, denote $\hat{h}_{C0} \in C$ as the estimated narrowband channel at R-Rx 305. First, in FIG. 5A, it can be observed that a change in the channel environment introduces variations within the over-the-air generated filter coefficients. Second, still referring to FIG. 5A, the relative distance between any pair of clusters of channel coefficients resulting from specific RIS 309 configurations remains constant between deployments. In this example, the OANN 200 takes configuration C0 as the baseline to generate the desired unit magnitude and no phase rotation, as shown in FIG. 5B. More importantly, the OANN 200 can adapt to varying channel conditions and generate a steady map for the available RIS 309 configurations. To accomplish this, the R-Tx 303 inverts the estimated channel vector as $p=(\hat{h}_{C0})^{-1} \in C$ to equalize the channel transformation for a given RIS 309 configuration. Although this step should ideally result in a unit magnitude and 0 phase rotation, channel estimation errors may introduce a geometrical translation from the desired CIR magnitude and phase. Capture such translation by $\theta(0 \leq \theta \leq \pi/2)$ computed as $\cos(\theta) = \text{Re}\{h^H p\}/(|h|\|p\|)$.

Figure 6:
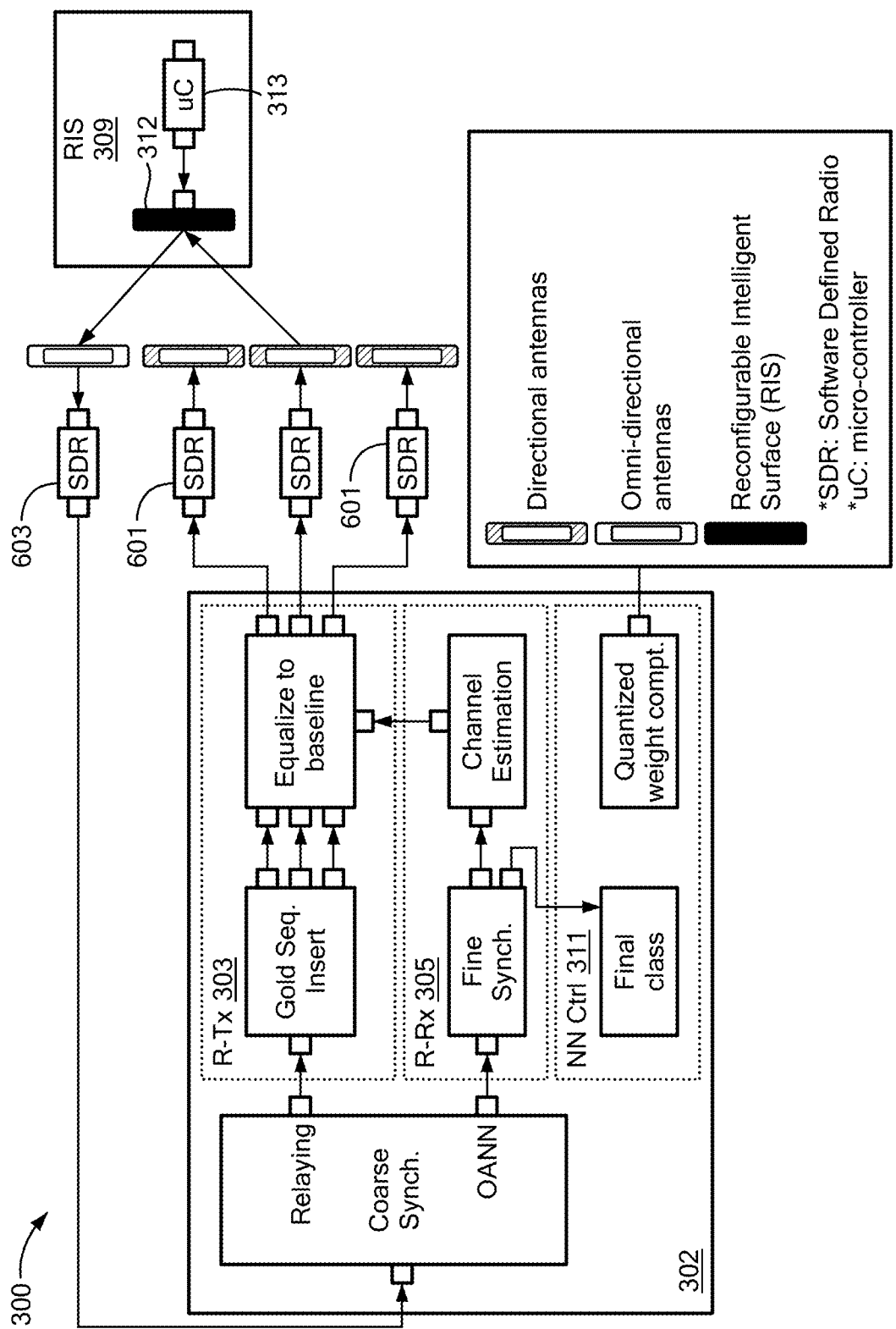
FIG. 6 is a functional schematic of hardware and software blocks within the relay modules of R-Tx, R-Rx, and neural network controller for an orchestrating software framework in accordance with various embodiments.

FIG. 6 is a diagram of hardware and software blocks within the relay modules of R-Tx 303, R-Rx 305, and the neural network controller 311 for the orchestrating software framework. In the implementation, the front-end of the relay is composed of four Ettus USRP X310 SDRs, each attached to a UBX 160 MHz daughterboard, which can flexibly digitize up to 200 MSamples per second. Three SDRs 601 serve in the R-Tx 303 interface, and a single SDR 603 serves in the R-Rx 305 interface. As one relay 302 supports up to three paths, the number of controllable RIS 309 also equals three, and the convolution filter size is limited to size 1×3 in the implementation. The SDRs are connected to the host machine via a 1 Gbps Ethernet link. All SDRs are synchronized in frequency and time through an Ettus OctoClock CDA-2990 that generates the 10 MHz reference frequency and a pulse per second (PPS) signal. The relay receiver R-Rx 305 is attached to a VERT2450 dual-band omnidirectional vertical antenna with 3 dBi gain. The relay transmitters R-Tx 303 have directional patch antennas with 18° of 3-dB beamwidth in azimuth and elevation and operate in the 2.4 GHz band. To achieve the desired interference nulls at unintended RIS 309, each R-Tx 303 antenna is oriented towards a dedicated RIS 309, making an angle of 45° with respect to the plane of any other neighboring RIS 309.

Figure 7:
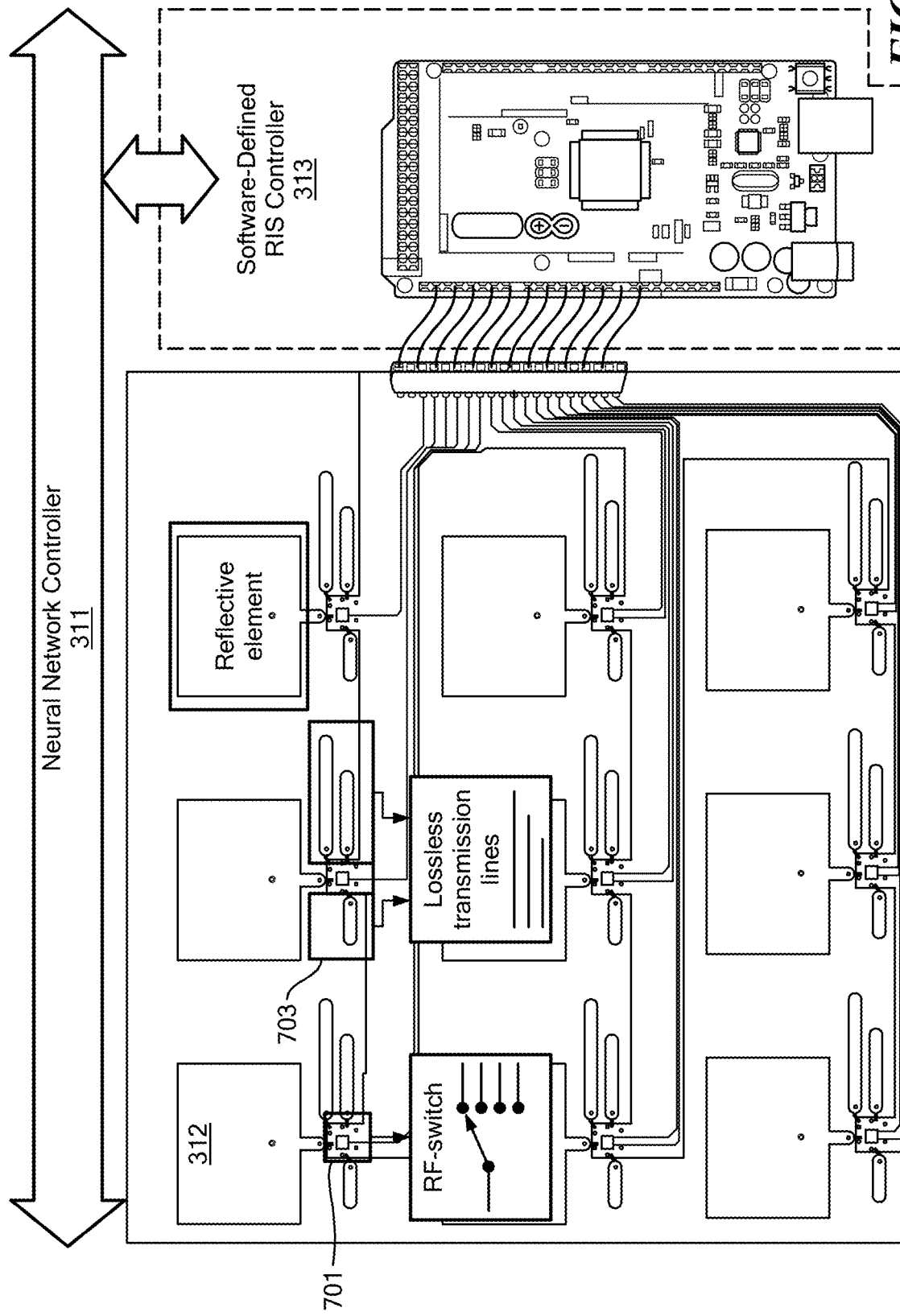
FIG. 7 illustrates a hardware prototype of a RIS in accordance with various embodiments.

FIG. 7 illustrates hardware prototype of a RIS 309 with 9 patch reflective antennas 312 whose signal reflections can be changed through software running in the controller 311 by selecting transmission lines 703 via an RF-switch 701. To access the feasibility of generating over-the-air FIR weights, several RIS 309 parameters are next studied, including (i) the type and number of the patch reflective antenna 312 within a RIS 309, their intra-RIS 309 separation of the reflective antenna 312, and (ii) the phase shifts that these antennas may generate. The signal propagation model can be leveraged to assess the impact of several RIS 309 parameters on the feasible over-the-air generated FIR weights. Some simulations can be included using a topology of a single RIS 309 placed equidistantly from the R-Tx 303 and R-Rx 305 antennas at 2.5 meters, while R-Tx 303 and R-Rx 305 antennas are separated by 5 meters. Each individual reflective element within the RIS 309 is a patch-type antenna of dimension $\lambda/2$ inserted between a two-layer PCB dielectric substrate and a full metal sheet at the bottom layer. These elements are spaced at a distance of exactly $\lambda/2$ to reduce the effect of mutual coupling between neighboring elements, as well as grating lobes in their radiation pattern. To assess how the OANN can benefit from having a larger number of reflective antennas 312, the simulations can be configured with three different RIS 309 sizes, e.g., 3×3, 5×5, and 7×7 reflective antennas 312, and the obtained phase span, as well as the resulting phase granularity can be evaluated. Here, the term span refers to the difference between the maximum and the minimum induced phase shifts possible at the R-Rx 305, whereas the term granularity refers to the minimum phase difference between any two realizable phases at the R-Rx 305.

Figure 8A:
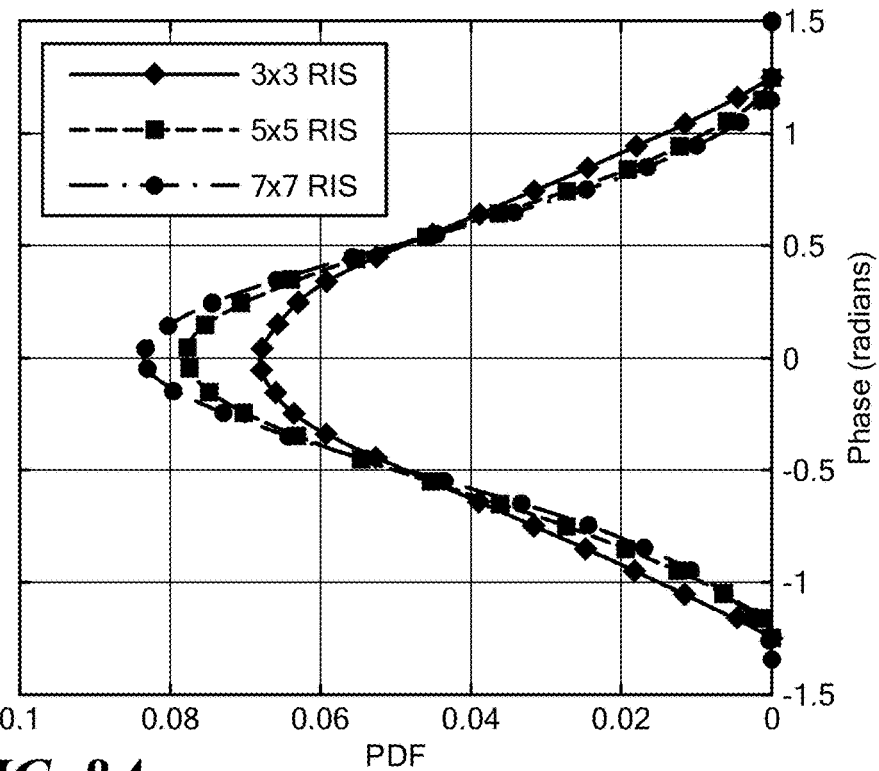
FIG. 8A illustrates CIR phase range and distribution with respect to RIS dimensions (the number of reflective antennas 312), showing that a larger RIS dimension does not result in a larger CIR phase range in accordance with various embodiments.
Figure 8B:
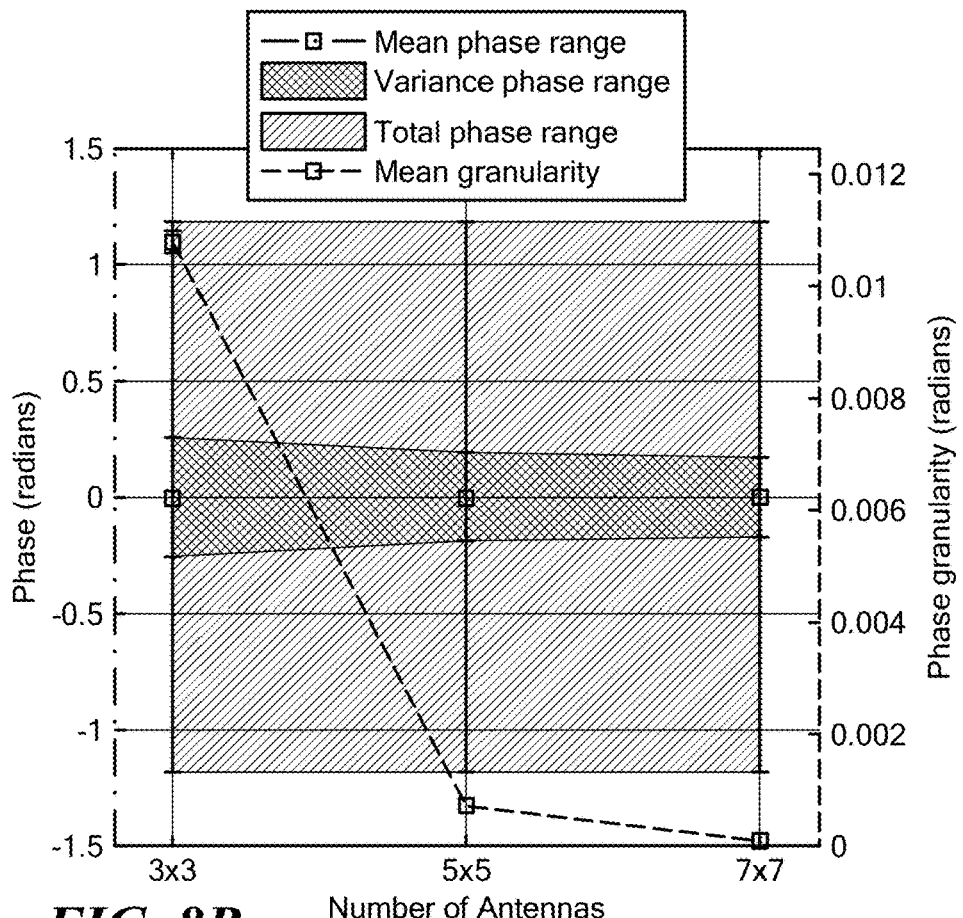
FIG. 8B illustrates CIR phase range and distribution with respect to RIS dimensions (the number of reflective antennas 312), showing that a larger RIS dimension results in a better granularity (less CIR weight quantization) in accordance with various embodiments.

As shown in FIG. 8A, having a larger RIS dimension does not lead to a larger span. However, a larger number of reflective elements 312 does achieve higher granularity, as seen in FIG. 8B. Nevertheless, this improvement does not, at this time, fully offset the larger size and cost of the RIS 309. For example, the improvement in granularity obtained by using a 7×7 instead of a 3×3 antenna RIS 309 currently increases the manufacturing price by $200. These findings motivate the selection of a small antenna set of M=9 reflective antenna 312, with a 3×3 layout in a 2D-plane. These antennas are finally printed on a RIS 309 PCB board with a FR-4 epoxy glass substrate of dimension 20 cm×20 cm×0.16 cm. Each of the nine reflective antenna 312 is connected to three loss-less transmission lines of different lengths through a single RF switch. The resulting four phases per antenna (including no phase shift) enables $4^9$ configurations per RIS 309, generating a rich diversity of distinct signal reflections. By selecting the length of the transmission lines, each reflective element's impedance can be altered, which in turn changes the irreflective coefficient and, consequently, introduces a phase shift to the signal reflected by that particular element. The implementation allows four possible shifts per element, although the overall phase at the receiver 305 is a combination of the individual shifts introduced by each of these nine reflective antennas 312. Thus, transmission lines 703 can be designed to generate uniformly separated phase shifts to enable a maximum span at the receiver 305 such as, for example, {45°, 90°, 135°}. A general purpose HMC7992 RF switch connected to an Arduino Mega2560 μcontroller activates the selected line per antenna in real-time.

Figure 9A:
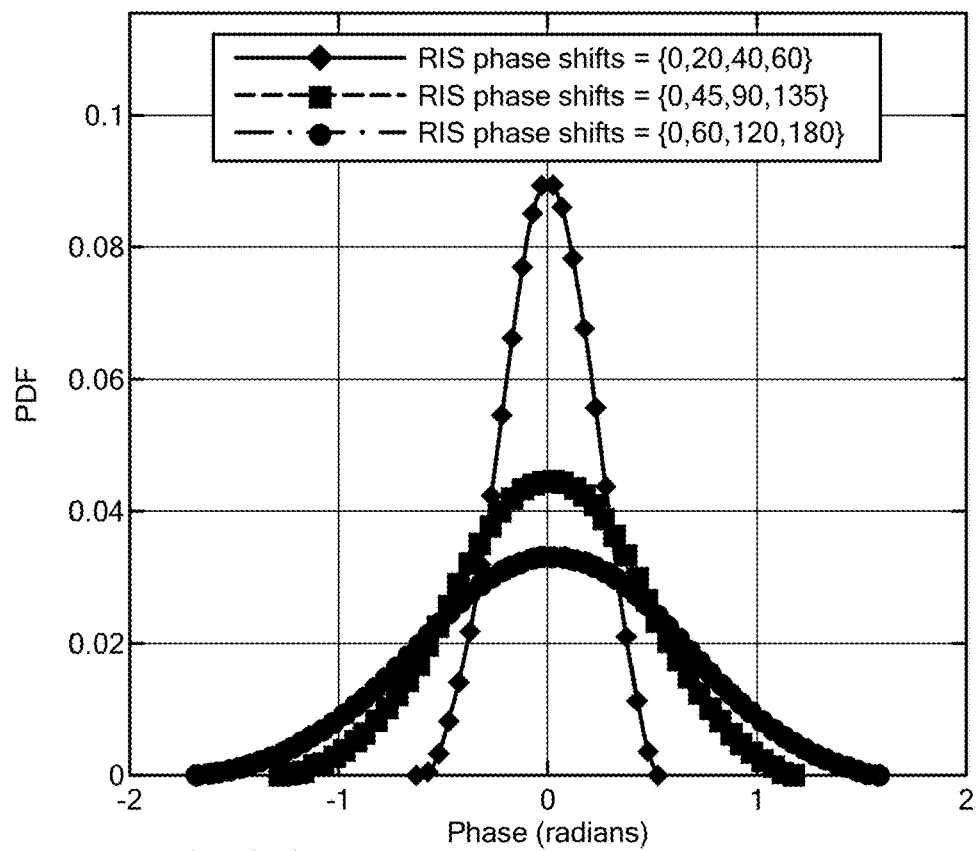
FIG. 9A illustrates study of the CIR phase range and distribution with respect to the RIS 309, showing that a larger shift span achieves a broader range of CIR phase values in accordance with various embodiments.
Figure 9B:
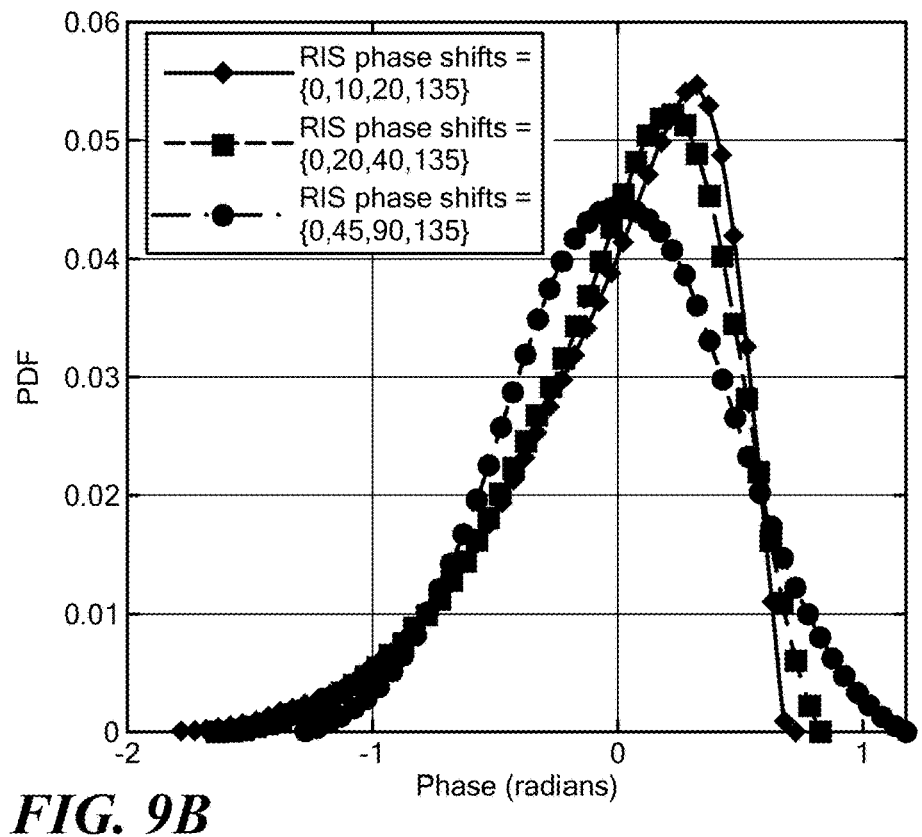
FIG. 9B illustrates study of the CIR phase range and distribution with respect to the RIS 309, showing that a uniform inter-shift spacing results in a uniform CIR phase distribution in accordance with various embodiments.

FIG. 9A illustrates study of the CIR phase range and distribution with respect to the RIS 309 wherein a larger shift span achieves a broader range of CIR phase values. FIG. 9B illustrates study of the CIR phase range and distribution with respect to the RIS 309 wherein a uniform inter-shift spacing results in a uniform CIR phase distribution. The span of possible phases is next determined, considering all possible combinations of the transmission line selections per reflective antenna 312. To do so, a single RIS 309 unit of 3×3 dimensions is simulated with four transmission lines but with different upper bounds of the maximum transmission line induced shift. This analysis is shown in FIG. 9A for such maximum shifts of 60°, 135°, and 180°. It can be observed that the span at the R-Rx 305 for the transmission line shift of 180° is over double that of a lower maximum value of 60°. Next, how the inter-shift angular distance shapes the range of realizable phases at the R-Rx 305 is studied. Three combinations are considered: with uniformly distributed phase shifts between transmission lines, narrowly spaced, and widely spaced shifts. From FIG. 9B it can be seen that the PDF for uniform spacing follows a Gaussian phase distribution. Conversely, non-uniform phase spacing results in a Rician distribution.

Figure 10B:
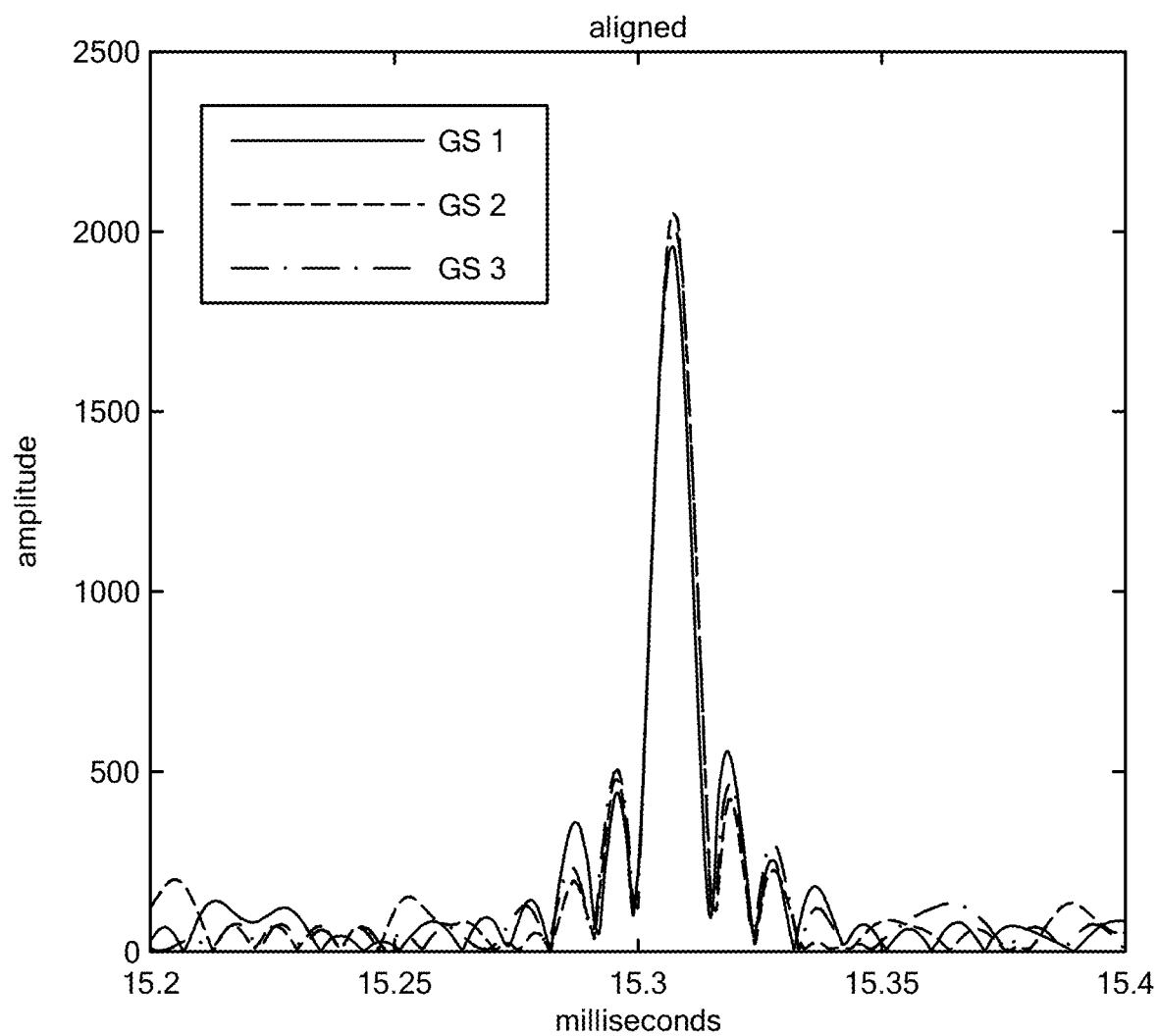
FIG. 10B illustrates precise synchronization at the R-Tx with precise synchronization in the OANN in accordance with various embodiments.

FIG. 10A illustrates precise synchronization at the R-Tx 303 for misaligned inter-RIS path arrivals. FIG. 10B illustrates precise synchronization at the R-Tx 303 for precise synchronization in the OANN 200.

Figure 11:
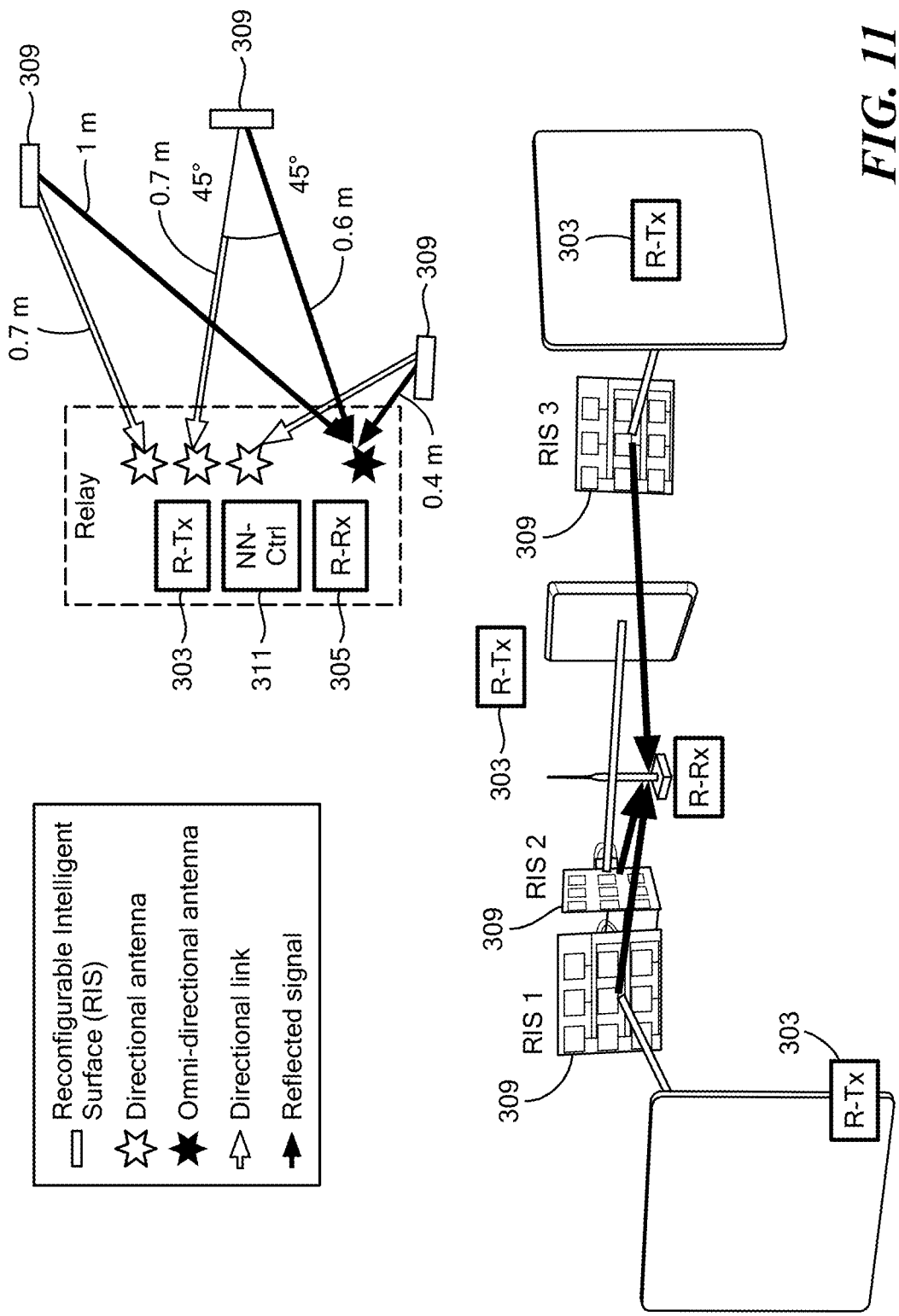
FIG. 11 illustrates a floor layout plan and experimental setup for an OANN testbed using a custom-built RIS in accordance with various embodiments.

FIG. 11 illustrates floor layout plan and experimental setup for an OANN 200 testbed using the custom-built RIS 309. The OANN 200 was deployed in an indoor laboratory area that offers rich multipath and a realistic environment. The relay 302 was used and three RIS 309 units were fabricated. The distance between the relay transmitter R-Tx 303 and RIS 309 as well as that between the RIS 309 and the relay receiver R-Rx 305 were both 0.7 meters. Each R-Tx 303 directional antenna faced the plane of its designated RIS 309 and made an incident angle of 45° with respect to the antenna at the R-Rx 305. The frequency of 2.49 GHz was used and a sampling rate of 1 MS/s. The orchestrating software framework ran on a dedicated Linux machine equipped with four cores and 64 GB RAM. The digital CNN was executed on a desktop equipped with dual NVIDIA GeForce RTX GPU.

Figure 12A:
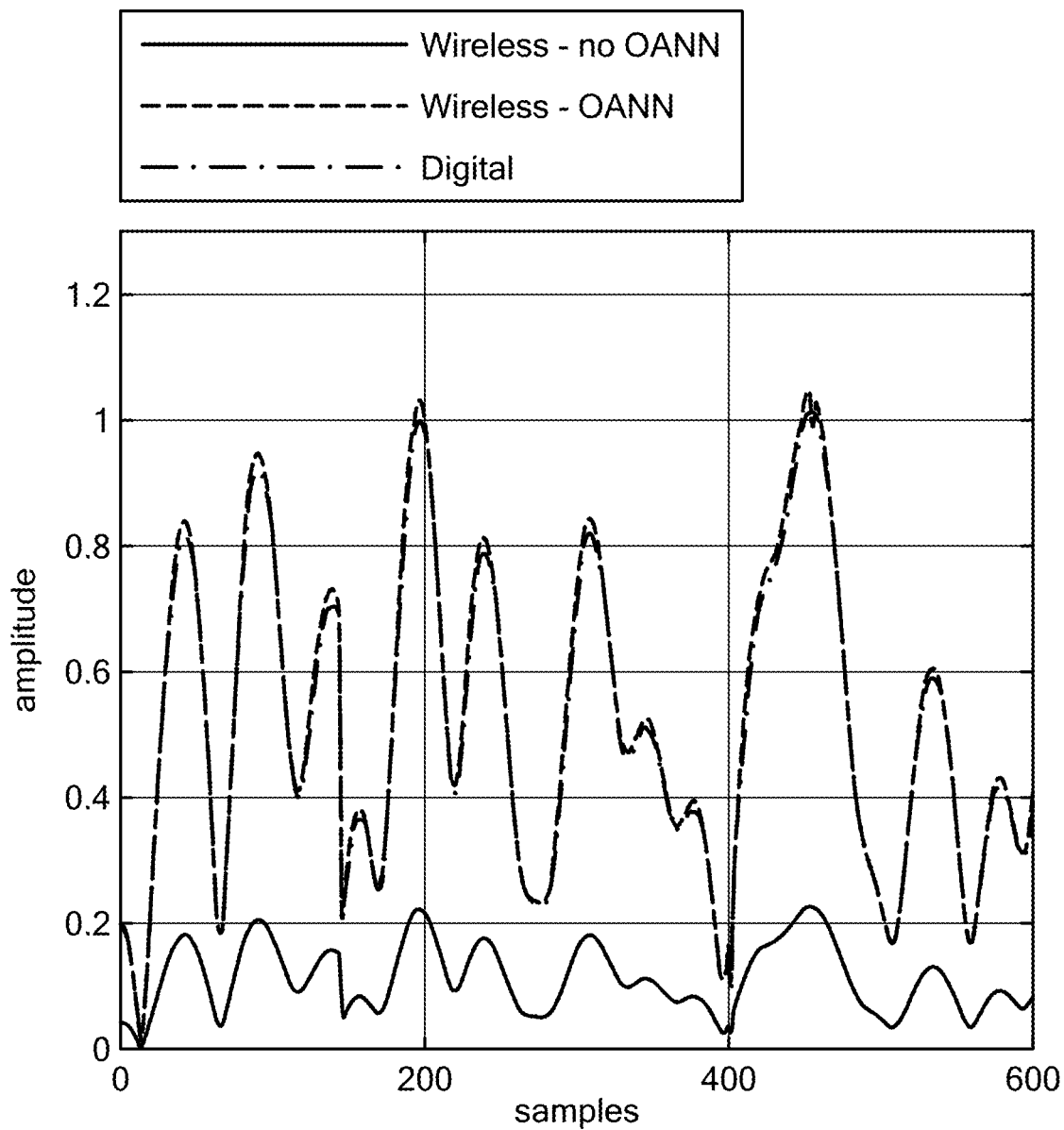
FIGS. 12A-12B illustrates a visual comparison between uncontrolled over-the-air convolution and over-the-air convolution using a RIS network.
Figure 12B:
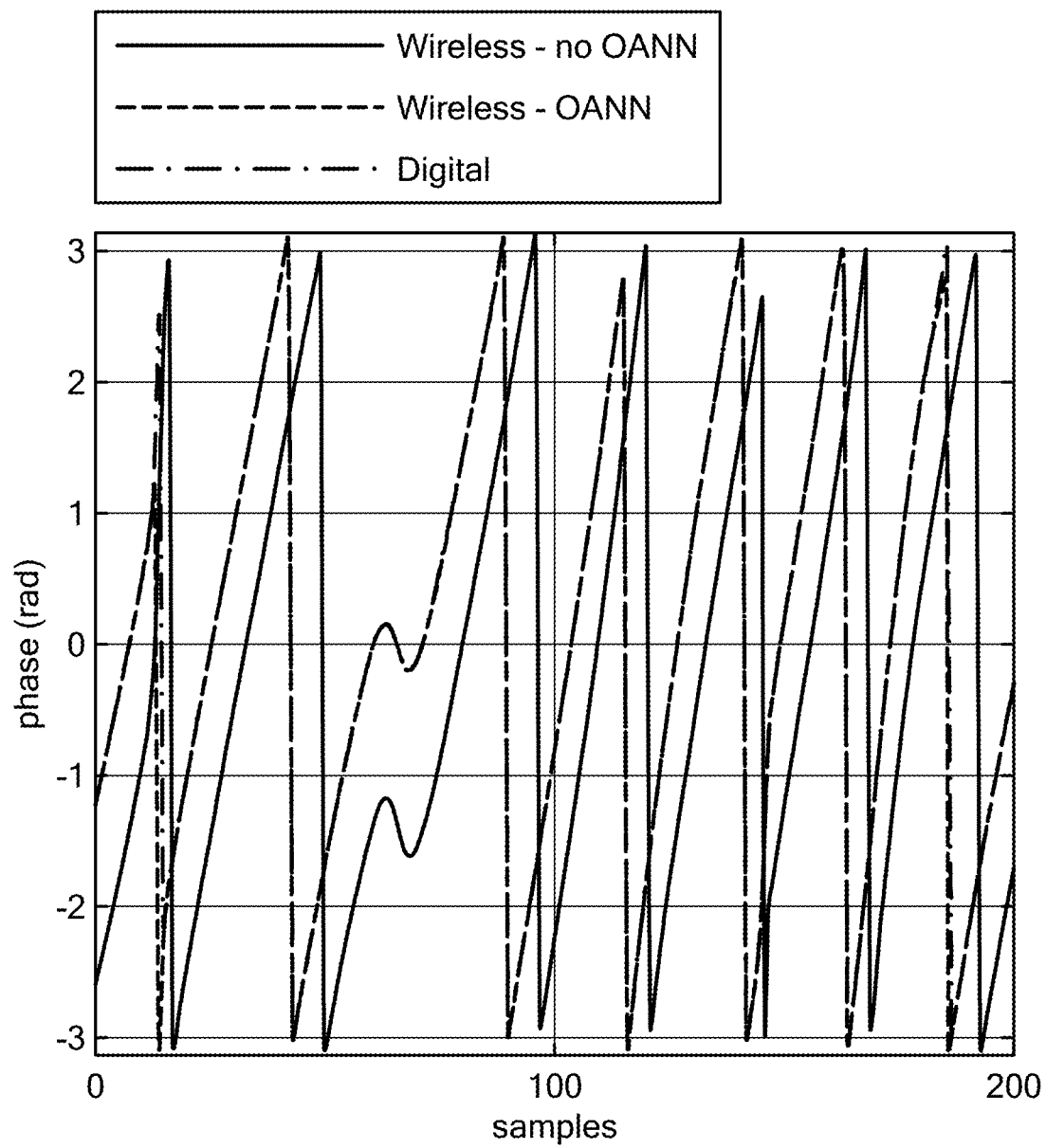

FIGS. 12A and 12B illustrate visual comparisons between uncontrolled over-the-air convolution and OANN 200 using a RIS network 307. The latter accurately realized the desired convolutional filter with negligible error. First was demonstrated the capability of the OANN 200 to generate a signal that matched the expected output of an all-digital FIR filter in a CNN. It started by measuring the magnitude and phase of two over-the-air convolutions, with and with-out fine-grained control by the relay and RIS network 307 and compared them against the all-digital counterpart. On the one hand, the quantized model was trained and accounted for the filter weights that the RIS 309 can provide. The relay 302 then engineered an over-the-air convolution tailored to the desired FIR behavior. At this stage, the orchestrating software framework transmits a BPSK digitally modulated signal with a unique Gold Sequence. Finally, after the signal had traversed the three RIS 309, the received signal was stored at the R-Rx 305, whose magnitude and phase were shown in FIGS. 12A and 12B, respectively. The received signal was compared to that of an all-digital convolution, shown in broken lines. It can be observed that these two were very similar, with a Root Mean Square Error (RMSE) of 0.11 and 0.6 in magnitude and phase, respectively. Thus, the OANN 200 can incorporate a CNN-like convolutional stage over-the-air. When the received signal was stored without controlling the RIS network 307, the lack of temporal alignment and the RIS 309 misconfiguration lead to a phase and magnitude mismatch with the all-digital convolution. This increased RMSE values to 0.46 and 2.58 in phase and magnitude, respectively.

Figure 13A:
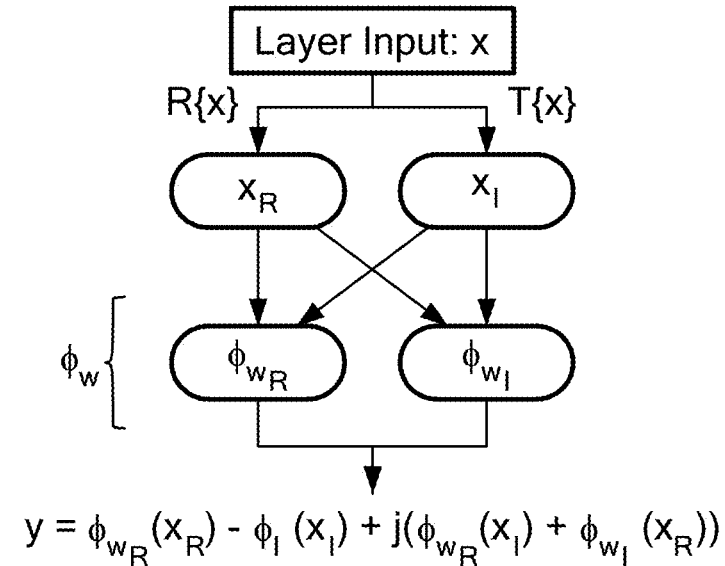
FIG. 13A illustrates a complex-valued layer ($\phi w$) diagram.
Figure 13B:
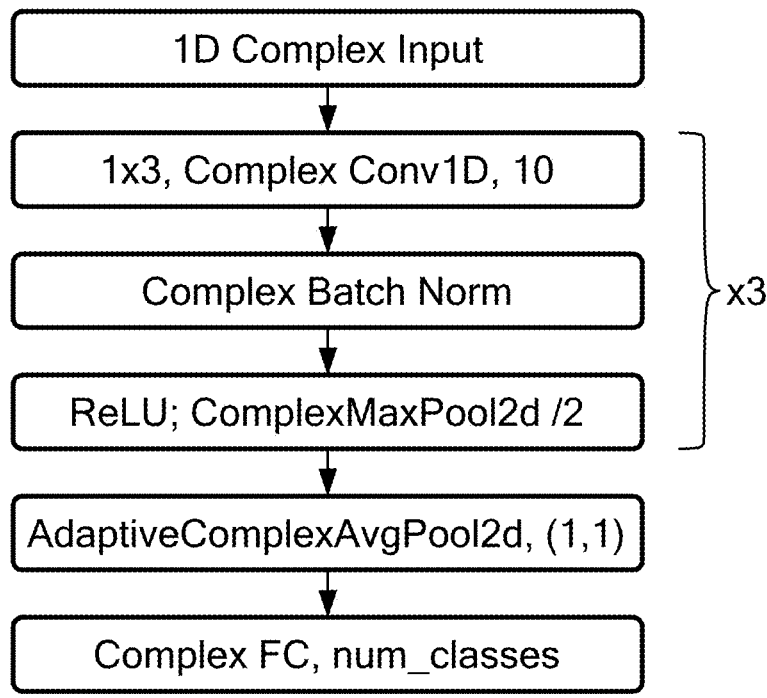
FIG. 13B illustrates a neural network architecture with complex weights used for modulation classification in accordance with various embodiments.

FIG. 13A illustrates a complex-valued layer ($\phi w$) diagram. FIG. 13B illustrates a neural network architecture with complex weights used for modulation classification. Thus, it can be demonstrated how the OANN can be applied to a real-world problem of modulation classification using the RADIOML 2018.01A dataset.

Dataset description: The dataset includes signals collected from over-the-air transmissions modulated with 24 different schemes, from BPSK to 256QAM, under variable link qualities or SNR levels that range from −10 to 30 dB. The data is organized in IQ sequences of 1024 I/Q samples, with 4096 sequences per modulation/SNR pair. Since this discussion focuses on the OANN design (and not improving on best-performing architecture for the problem of modulation classification), consider a smaller subset of the problem with four of the most commonly used classes of BPSK QPSK, 16QAM, and 32QAM. This reduced dataset can be split into non-overlapping portions for training (60%), validation (20%), and testing (20%).

Architecture Description: As shown in FIG. 13B, the deep CNN model is composed of three convolutional layers: a bundle of convolutional FIR filters followed by the pertinent batch normalization, activation (e.g., ReLu), and max pooling, an adaptive average pool layer, and a single fully connected layer. PyTorch was used for implementation, with the number of filters as ten and learning rate $1e^{-4}$.

Figure 14A:
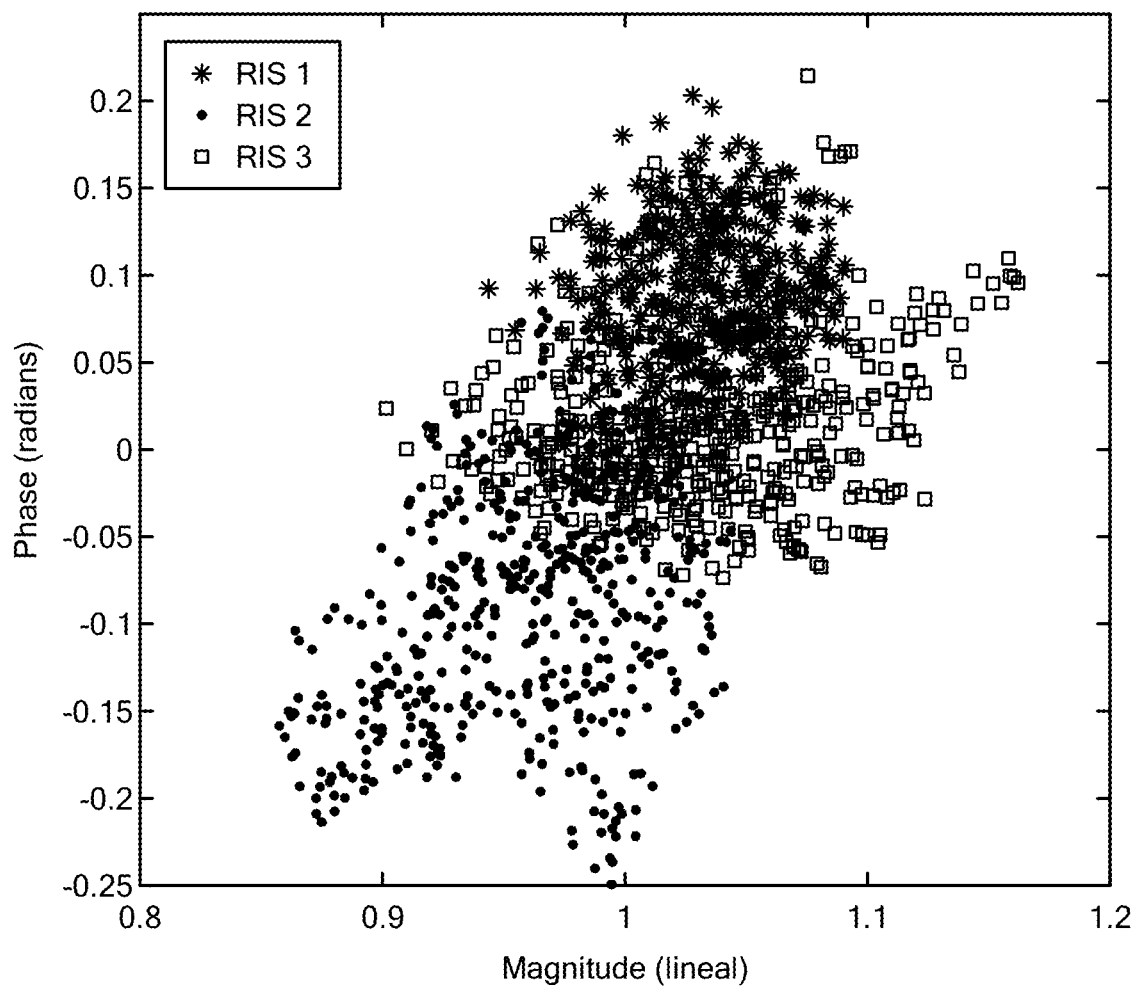
FIG. 14A illustrates realizable FIR filter taps (magnitude and phase) using RIS in accordance with various embodiments.
Figure 14B:
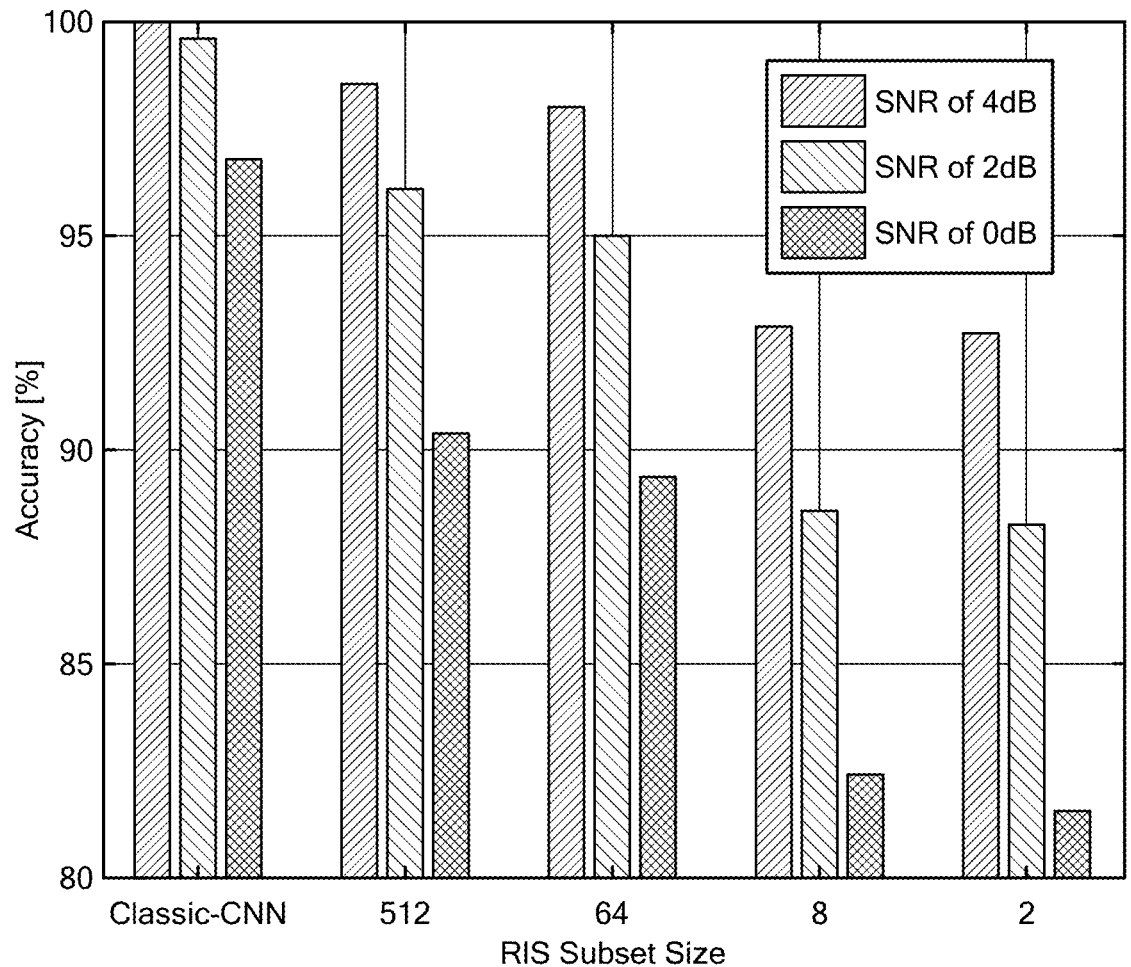
FIG. 14B illustrates the effect of quantization on the accuracy in modulation classification for three different SNR values in accordance with various embodiments.

FIG. 14A illustrates realizable FIR filter taps (magnitude and phase) using RIS 309 and FIG. 14B illustrates effects of quantization on the accuracy in modulation classification for three different SNR values. The proposed QM-CNN boundaries are desired to be analyzed in the modulation classification application using the OANN 200 under variable wireless link conditions. Similar to the procedure explained in the previous section, the set of feasible weights that the RIS 309 can realize is extracted and used to train QM-CNN (see FIGS. 13A and 13B). For a tractable analysis, the lower end of the shifting range (0° and 45°) is considered for each reflective element in all RIS 309. This gives a total of $2^9=512$ different phase shifts for the reflected signal. The measured received phase at the R-Rx 305 is shown in FIG. 14A, where each point is an average of over ten transmissions for a particular RIS 309 configuration from the 512 combinations. To assess how quantization impacts accuracy, smaller sets of candidate weights are generated by randomly selecting subsets of size $\{2, 8, 64\}$ from the global set of 512. Here, 2 represents the most restrictive (or quantized) case, implying that the entire QM-CNN is constructed with two possible weights for each convolutional filter tap. FIG. 14B shows the average accuracy of QM-CNN when provided with various subset sizes for CIR weights and SNR values. Note that the SNR captures the wireless link quality from the Tx 301 to R-Tx 303 (see FIG. 3) and is provided by the dataset. Reducing the set of realizable weights impacts QM-CNN accuracy, which falls more than an 8% for a quantization level below 64 and the lowest SNR evaluated of 0 dB. As the SNR increases up to 4 dB, the accuracy drops only a 2% for quantization levels above 8, becoming only critical (7%) for a quantization as low as eight levels and below.

Figure 15A:
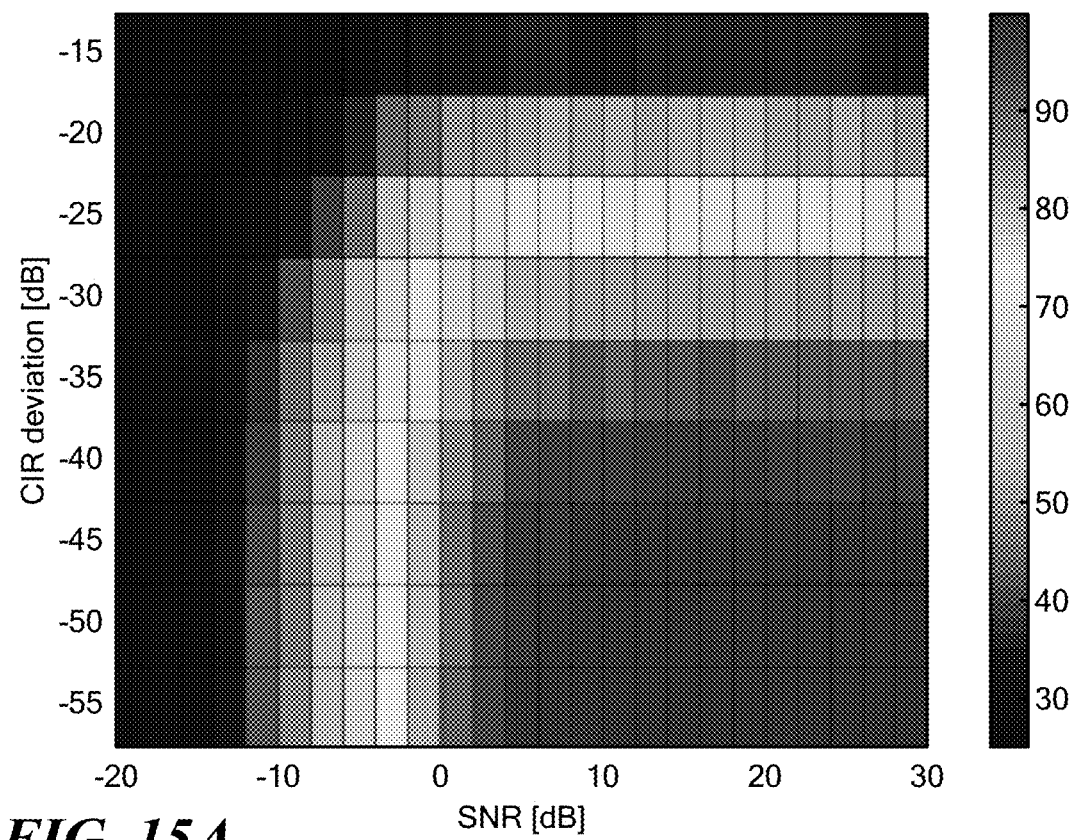
FIG. 15A illustrates accuracy in modulation classification using quantized model (QM-CNN).
Figure 15B:
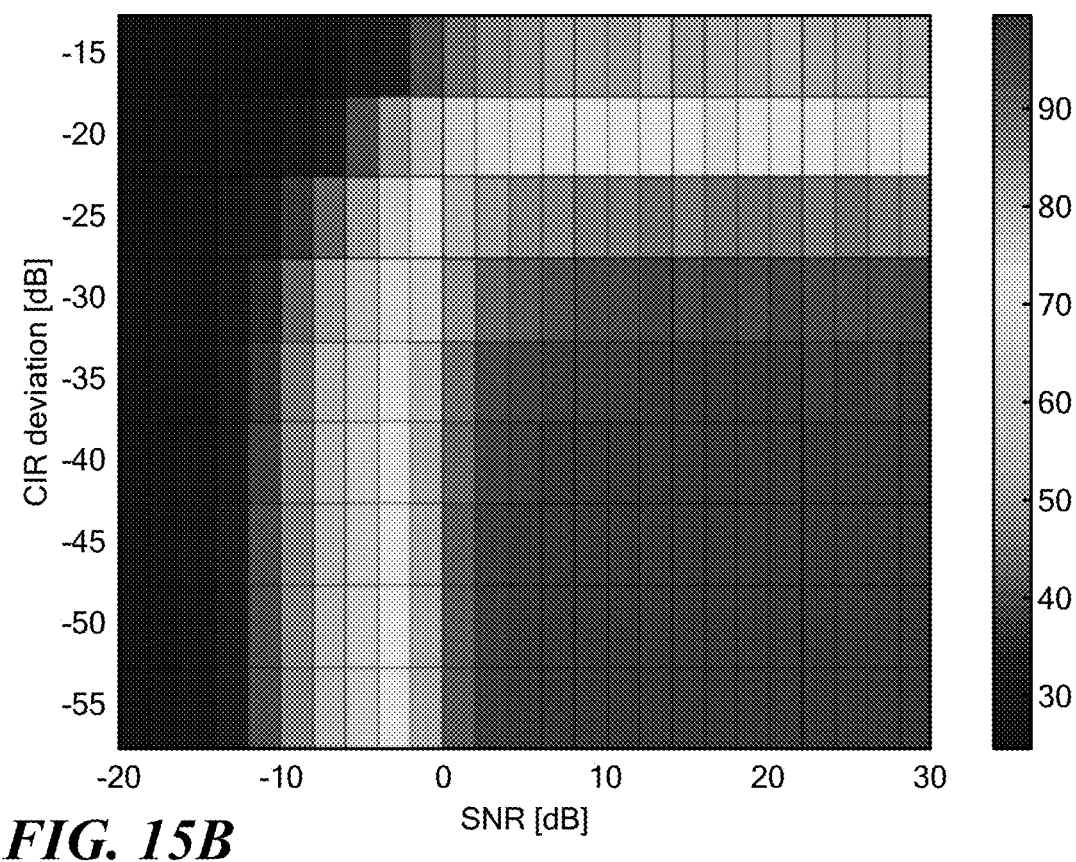
FIG. 15B illustrates accuracy in modulation classification using a quantized robust approach (RQM-CNN).

FIG. 15A illustrates accuracy in modulation classification using quantized model (QM-CNN). FIG. 15B illustrates accuracy in modulation classification using the quantized robust approach (RQM-CNN). The robustness of the RQM-CNN approach is validated, which aims to mitigate deviations in RIS-engineered CIR weights due to noise. FIG. 15B gives a visualization of such a deviation illustrating the worst-case deviation measured empirically on the complete secondary path: R-Tx 303 to RIS 309 to R-Rx 305, giving a CIR variance of −35 dB. Once a range of possible CIR deviations is profiled, the RQM-CNN is trained under an AWGN distribution within this CIR variance bound, following the steps described herein. The RQM-CNN performance is tested for SNR levels between −20 and 30 dB on the primary link given as: Tx 301 to R-Rx 305, and CIR deviations between −55 and −15 dB over the secondary link R-Tx 303 to RIS 309 to R-Rx 305. The range −15 to −35 dB is used to stress-test the approach under noisier conditions that were not encountered during experiments. As opposed to this, simpler QM-CNN approach does not account for such over-the-air impairments during training. Results shown in FIG. 15A reveal that QM-CNN provides good performance for higher SNR and CIR deviations but does not provide accuracy above 88% for SNR levels below 4 dB and CIR levels above −35 dB. As shown in FIG. 15B, the RQM-CNN approach achieves an accuracy of up to 96% in the same regimes.

Figure 16:
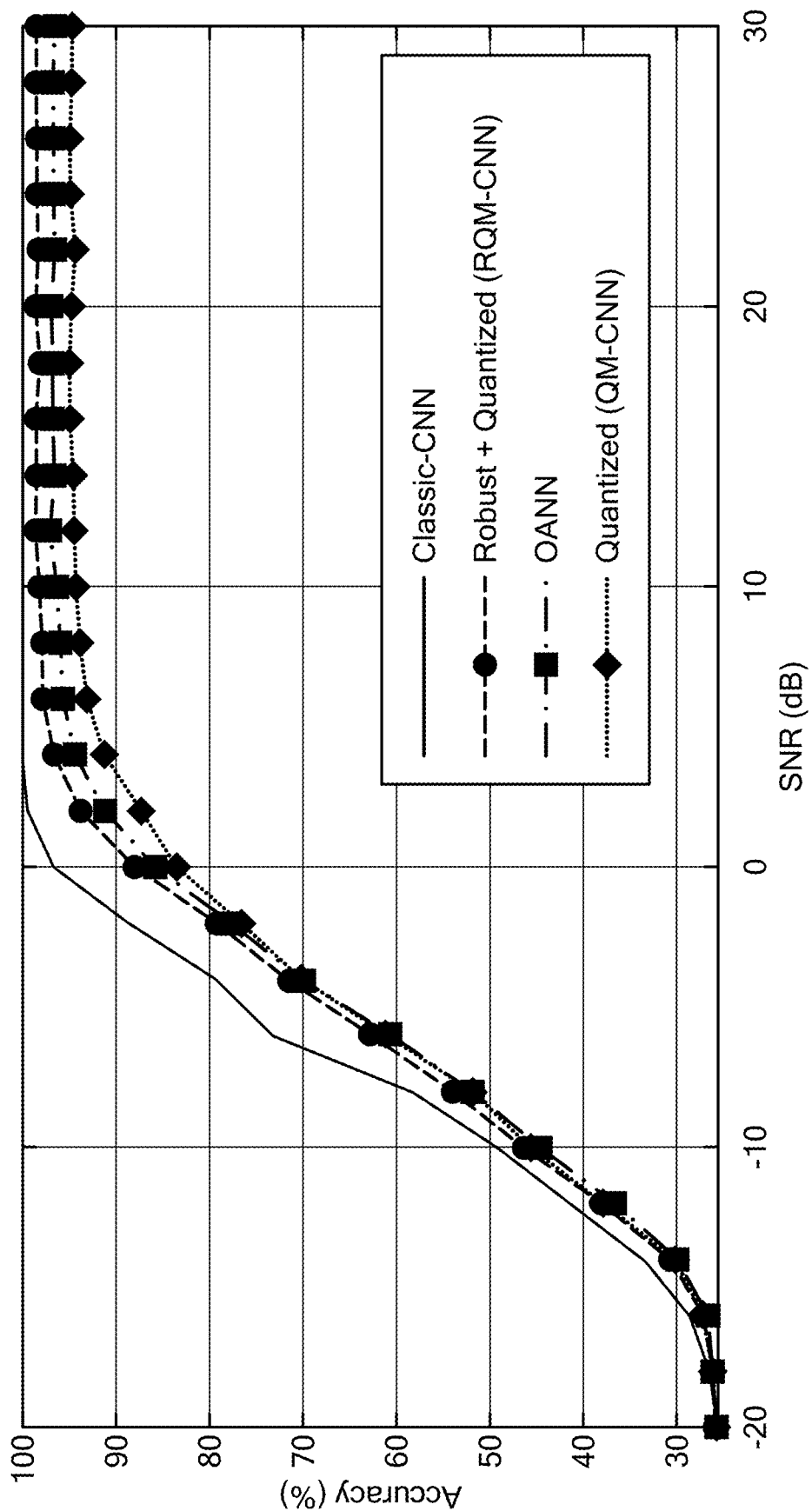
FIG. 16 illustrates accuracy in modulation classification using all-digital convolution (Classic-CNN), quantized approaches QM-CNN and RQM-CNN, and the OANN system.

FIG. 16 illustrates accuracy in modulation classification using all-digital convolution (Classic-CNN), quantized approaches QM-CNN and RQM-CNN, and the OANN system. The experimentally derived OANN accuracy is compared with that of all three CNN versions discussed so far: Classical-CNN and the quantized versions QM-CNN and RQM-CNN, as a function of the SNR level of the Tx 301 to R-Rx 305 link. Here, QM-CNN and RQM-CNN are trained and tested. The OANN uses the same trained weights as RQM-CNN but must operate within dynamic conditions that arise from over-the-air transmissions during testing, such as signal impairments introduced by the RF front ends and channel equalization errors. These modify the RIS-engineered FIR taps from the initial values acquired at the mapping stage (see FIG. 5b), which were earlier characterized as AWGN. The experimental results using the OANN system are presented in FIG. 16, where the CIR inaccuracies are selected from a Gaussian PDF, ranging from −15 dB to −50 dB. In the figure, the Classical-CNN bounds the performance for any given SNR value. A similar accuracy can be observed reported from all four models for very low SNR (between −20 dB and −5 dB), which is extremely challenging for the classification task. For higher SNR values, QM-CNN reports a lower maximum accuracy of 95%, while the robust training in RQM-CNN raises the accuracy up to 98%. The OANN closely follows the bound of the software-based RQM-CNN, with a drop in accuracy of only 2%, and an overall drop with respect to Classic-CNN of 3.2% for the SNR range of [6, 30] dB.

The technology provides a number of embodiments, features, and aspects. The technology develops the theory that maps digital (processing-based) and analog (over-the-air) convolutions and shows how this equivalence helps run inference on trained neural networks without dedicated computational hardware. The technology presents over-the-air convolution and demonstrates it as a useful processing step for inference tasks in a convolutional neural network (CNN). The technology engineers the ambient wireless propagation environment through reconfigurable intelligent surfaces (RIS) to design and develop over-the-air neural networks. The technology provides a method to train CNNs with a quantized set of weights drawn from the RIS-generated candidate set without relevant loss of accuracy for an example task of modulation classification, compared to unconstrained training The technology demonstrates an orchestrating software framework to control the RIS network 307 that synchronizes and aligns start times of the relay transmitters and receiver and reconfigures the RIS 309 on demand to change its reflection coefficients. The technology can transform surfaces into over-the-air computing devices and can be cost-efficient in terms of having a few electronic components, low-power, and mainly passive components.

The technology provides a useful solution by shifting the burden of executing the CNNs architecture from dedicated digital devices into the ambient environment. The technology eliminates the need for dedicated computation devices such as mobile edge devices or FPGAs. The technology does not incur data forwarding latency to the edge computing server and does not consume power in a dedicated processor/GPU.

The technology can enable processor-free inference for neural networks that are significantly being used in a wide variety of applications. It does not require signal storage (that can easily reach several GB for seconds of IQ samples). It does not incur data forwarding latency to the edge computing server. It does not consume power in a dedicated processor/GPU.

The technology can play a role in the next generation of wireless communications, including 6G and beyond. The technology can play a role in sustainable and intelligent infrastructures, including smart cities. The technology can play a role in public safety and military applications by creating intelligent computing surfaces on UAVs, mobile vehicles, etc. The technology is applicable in intelligent infrastructures.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A method for implementing an over-the-air neural network (OANN) comprising:
   receiving, at a relay receiver of a relay node, a signal of interest from a transmitter;
   directionally re-transmitting the signal of interest from each of a plurality of relay transmitters of the relay node to a corresponding one of a plurality of programmable reconfigurable intelligent surfaces (RIS);
   reflecting, by each of the plurality of RIS, the corresponding re-transmitted signal of interest;
   adjusting, by a neural network controller, a reflection angle of each of the plurality of RIS to direct the reflected signals of interest to combine in a deterministic manner at the relay receiver, wherein the adjusting operates the plurality of RIS to create the signal reflections to emulate determined finite impulse response (FIR) filters; and
   training the OANN using weights of neurons drawn from a finite set of distinct channel impulse responses (CIR) that correspond to finite impulse response (FIR) filters realizable by the plurality of RIS, wherein each CIR is determined by activating a different configuration of the plurality of programmable RIS and the deterministic combination of reflected signals at the relay receiver is determinative of the output of a convolution step.

2. The method of claim 1, wherein the relay receiver is an omnidirectional antenna.

3. The method of claim 1, wherein the plurality of transmitters are directional transmitters.

4. The method of claim 1, wherein a maximum number of CIR and corresponding FIR filters implementable by the OANN is at least partially determined by a maximum number of deterministic sets of reflections producible by the plurality of RIS.

5. The method of claim 4, wherein the maximum number of deterministic sets of reflections producible by the plurality of RIS is scalable according to a number of possible phase changes of each RIS, a number of the plurality of RIS, and a number of directional antennas at the relay node.

6. The method of claim 1, the step of adjusting further comprising reconfiguring, by the neural network controller, reflection angles of the plurality of RIS to form an updated RIS configuration corresponding to a next convolutional.

7. The method of claim 1, wherein the neural network controller is in communication with the plurality of RIS via a dedicated control plane configured to connect the relay node to the plurality of RIS.

8. The method of claim 1, further comprising, by the neural network controller, at least one additional digital-only processing operation including at least one of a rectified linear unit (ReLu) activation, a batch normalization, a max pooling, a fully connected layer, or combinations thereof.

9. An over-the-air neural network system comprising:
a transmitter system operable to transmit signals of interest;
a relay node comprising:
 a relay receiver,
 a plurality of relay transmitters;
a neural network controller; and
a plurality of programmable reconfigurable intelligent surfaces (RIS), each of the plurality of RIS corresponding to one of the plurality of relay transmitters, each RIS operable to directionally reflect signals with desired channel transformations;
wherein the relay receiver is operable to receive the signals of interest and forward the signals of interest to the relay transmitters, each of the relay transmitters operative to directionally re-transmit the signals of interest to a corresponding one of the plurality of programmable RIS, and each RIS is operable to reflect the corresponding re-transmitted signals of interest, and the neural network controller is operable to adjust a reflection angle of each of the plurality of RIS to direct the reflected signals of interest with desired channel transformations to combine in a deterministic manner at the relay receiver,
wherein adjustment of the reflection angle operates the plurality of RIS to create the signal reflections to emulate determined finite impulse response (FIR) filters; and
wherein the over-the-air neural network system comprises a convolutional neural network trained using weights of neurons drawn from a finite set of distinct channel impulse responses (CIR) that correspond to finite impulse response (FIR) filters realizable by the plurality of RIS, wherein each CIR is determined by activating a different configuration of programmable RIS, and reflected signals combine at the relay receiver to determine the output of the convolution step.

10. The system of claim 9, wherein the relay receiver is an omnidirectional antenna.

11. The system of claim 9, wherein the relay transmitters are directional antennas.

12. The system of claim 9, wherein each RIS is a planar array of passive reflective antenna.

13. The system of claim 12, wherein each passive reflective antenna each includes a selectable range of programmable impedance matching circuits.

14. The system of claim 13, wherein:
selective activation of one or more of the programmable impedance matching circuits changes an impedance of a corresponding one of the reflective antenna;
changing the impedance of the corresponding one of the reflective antennas alters an antenna reflection coefficient of the corresponding reflective antenna, thereby changing a phase of the reflected signal.

* * * * *